(12) United States Patent
Rocha et al.

(10) Patent No.: US 12,337,635 B2
(45) Date of Patent: Jun. 24, 2025

(54) MULTI-MODE CONVERTIBLE VEHICLE

(71) Applicant: Thius Canada Inc., Nepean (CA)

(72) Inventors: Bruno Rocha, Ottawa (CA); Abhishek Joshi, Nepean (CA); Maurizio Ienzi, Nepean (CA); Christoforo Ienzi, Nepean (CA)

( * ) Notice: Subject to any disclaimer, the term of this patent is extended or adjusted under 35 U.S.C. 154(b) by 0 days.

(21) Appl. No.: 18/553,638

(22) PCT Filed: Apr. 8, 2022

(86) PCT No.: PCT/CA2022/050543
§ 371 (c)(1),
(2) Date: Oct. 2, 2023

(87) PCT Pub. No.: WO2022/213209
PCT Pub. Date: Oct. 13, 2022

(65) Prior Publication Data
US 2024/0181825 A1  Jun. 6, 2024

Related U.S. Application Data

(60) Provisional application No. 63/172,111, filed on Apr. 8, 2021.

(51) Int. Cl.
| | | |
|---|---|---|
| *B60F 5/02* | (2006.01) | |
| *B64C 37/00* | (2006.01) | |
| *B64C 39/02* | (2023.01) | |
| *B64U 10/14* | (2023.01) | |
| *B64U 10/70* | (2023.01) | |
| *B64U 30/27* | (2023.01) | |
| *B64U 30/296* | (2023.01) | |
| *B64U 30/297* | (2023.01) | |

(Continued)

(52) U.S. Cl.
CPC ............... *B60F 5/02* (2013.01); *B64C 37/00* (2013.01); *B64C 39/02* (2013.01); *B64U 10/14* (2023.01); *B64U 10/70* (2023.01); *B64U 30/27* (2023.01); *B64U 30/296* (2023.01); *B64U 30/297* (2023.01); *B64U 50/23* (2023.01); *B64U 60/10* (2023.01); *B60F 2301/04* (2013.01)

(58) Field of Classification Search
CPC ...... B64U 10/13; B64U 10/70; B64U 30/296; B64U 60/70
See application file for complete search history.

(56) References Cited

U.S. PATENT DOCUMENTS

| | | |
|---|---|---|
| 7,959,104 B2 | 6/2011 | Kuntz |
| 8,794,564 B2 | 8/2014 | Hutson |
| (Continued) | | |

FOREIGN PATENT DOCUMENTS

| | | | | |
|---|---|---|---|---|
| CN | 106080070 A | * | 11/2016 | ................ B60F 5/02 |
| CN | 109249768 A | * | 1/2019 | ................ B60F 5/02 |
| (Continued) | | | | |

*Primary Examiner* — Timothy D Collins
*Assistant Examiner* — Justin Michael Heston

(57) ABSTRACT

A convertible multi-mode vehicle capable of motorized travel in the air, on land, on water, and under water. The multi-mode vehicle is capable of controlled aerial flight, movement on the ground in terrestrial environments, on an aquatic surface, as well as underwater by changing between the different modes. Pivoting propulsion motors enable a convertible configuration from one vehicle locomotion mode to another.

21 Claims, 14 Drawing Sheets

(51) Int. Cl.
  *B64U 50/23* (2023.01)
  *B64U 60/10* (2023.01)

(56) References Cited

U.S. PATENT DOCUMENTS

| | | |
|---|---|---|
| 8,991,740 B2 | 3/2015 | Olm et al. |
| 9,844,990 B2 | 12/2017 | Hobart et al. |
| 10,669,024 B2 | 6/2020 | Wang |
| 2016/0376000 A1 | 12/2016 | Kohstall |
| 2018/0257448 A1 | 9/2018 | Schreiner |
| 2018/0281537 A1* | 10/2018 | Leppo .................... B64U 10/70 |
| 2019/0120077 A1* | 4/2019 | Kempshall ............... B64C 37/00 |
| 2020/0207469 A1* | 7/2020 | Benedict ............... B64U 30/297 |
| 2024/0076065 A1* | 3/2024 | Torgersen ............... B64C 37/00 |

FOREIGN PATENT DOCUMENTS

| | | | | |
|---|---|---|---|---|
| CN | 109334365 A | * | 2/2019 | ........... B60F 3/0007 |
| KR | 20170132996 A | * | 12/2017 | |
| KR | 102355753 B1 | | 1/2022 | |

* cited by examiner

MULTI-MODE CONVERTIBLE VEHICLE

CROSS-REFERENCE TO RELATED APPLICATION

This application claims priority to United States provisional patent application US63/172,111 filed 8 Apr. 2021, and is a United States National Stage application under 35 U.S.C. 371 of PCT Application No. PCT/CA2022/050543, filed on 8 Apr. 2022, both of which is are hereby incorporated by reference herein in its their entirety

FIELD OF THE INVENTION

The present invention pertains to a convertible multi-mode vehicle capable of motorized travel or locomotion in the air, on land, on water, and/or under water.

BACKGROUND

Vehicles that can travel in multiple modes provide versatility for transportation, surveying, exploration, monitoring, inspection, security, tracking, patrolling, law enforcement, military operations, defense systems, search and rescue, fire detection and fighting, disaster management, mapping, filming, data acquisition, communications, and surveillance, in between others.

There are various multi-mode pilotless vehicles known that can travel in air as well as water or land. In one example, U.S. Pat. No. 10,669,024B2 to Wang describes an amphibian unmanned aerial vehicle that can travel on water and in air having a control device configured to control the power device to switch an operating mode of the power device to cause the unmanned aerial vehicle to fly in air or navigate on a water surface. In another example United States patent application US2020/0207469A1 to Benedict describes a vehicle that can travel in air and on land that has four rotors wherein, when the rotors are disposed in a horizontal position, the rotors generate lift for air flight, and when the rotors are disposed in a vertical position, the rotors are configured to engage a surface to transport the vehicle.

Aircraft, including pilotless quadcopter style aircraft, are designed to be as light as possible to minimize required power for flight and therefore preserve available energy. This enables to decrease necessary available energy, further decreasing weight and consequently decreasing the required flight power and required energy source for maintaining endurance and/or range. This weight reduction results in a cyclic and converging benefit loop resulting in performance optimization. Specifically, maintaining vehicle energy reserve and decreasing energy requirements, for instance by reducing the number of travel power generating elements and optimizing components for particular modes of travel in such a convertible vehicle provides for longer flight times and travel distances. Efficient conversion of motorized power into vehicle propulsion for multiple modes in a convertible vehicle provides control as well as efficient power usage. Additional weight provided by single purpose motors increases power requirements for travel with dramatic effects particularly during flight, reducing flight time and/or range, (beyond also on land or water travel), needed available energy, size, in a cyclic penalizing loop.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a convertible vehicle capable of motorized travel in the air, on land, on water, and under water.

In an aspect there is provided a multi-mode convertible vehicle comprising: a vehicle body; a plurality of propulsion units, each propulsion unit having a propulsion axis and pivotally connected to the vehicle body by a support arm, each of the plurality of propulsion units comprising: a propeller comprising a propeller hub; a propulsion motor connected to the propellor hub for rotating the propeller hub on the propulsion axis; and a wheel comprising a wheel hub, at least one wheel blade, and an outer wheel rim, the wheel hub mechanically engageable with the propeller hub and rotatable on the propulsion axis; and a pivot motor connected to at least one propulsion unit to adjust a pivot position of at least one of the plurality of propulsion units relative to the vehicle body.

In an embodiment of the vehicle, the propulsion axis is in a vertical or approximately vertical position relative to the vehicle body the propellor hub is rotated by the propeller motor independent of the wheel, and when the propulsion axis is pivoted in a horizontal or approximately horizontal position relative to the vehicle body the propeller hub and wheel are engaged and the propeller motor turns the wheel and propeller.

In another embodiment of the vehicle, each propeller hub is connectable to a corresponding wheel in the propulsion unit through at least one gear.

In another embodiment of the vehicle, the vehicle comprises three or four, or more propulsion units.

In another embodiment of the vehicle, the wheel hub is engageable with the propeller hub using one or more of a magnet, spring, fork, paddle, and clutching element.

In another embodiment of the vehicle, the vehicle body is articulated.

In another embodiment of the vehicle, each of the plurality of propulsion units has its own pivot motor.

In another embodiment of the vehicle, the wheel comprises a planetary gear and the wheel hub serves as a sun gear in the planetary gear.

In another embodiment of the vehicle, the propeller hub and wheel hub have engageable teeth.

In another embodiment of the vehicle, the propulsion unit further comprises a propulsion clutch configured to apply pressure to the wheel to connect the propeller and the wheel when the propulsion axis is pivoted in a horizontal position.

In another embodiment, the vehicle further comprises a retaining element to retain the wheel in a disconnected position from the propeller when the propulsion axis is pivoted in a vertical or approximately vertical position.

In another embodiment, the vehicle further comprises a landing gear.

In another embodiment of the vehicle, the landing gear further comprises a positioning arm which aligns with the wheel and supports wheel rotation when the propulsion axis is pivoted in a horizontal or approximately horizontal position.

In another embodiment of the vehicle, the vehicle body has neutral buoyancy in water.

In another embodiment of the vehicle, each wheel comprises a plurality of wheel blades.

In another embodiment of the vehicle, each of the plurality of wheel blades is an airfoil configured for aquatic propulsion.

In another embodiment, the vehicle further comprises one or more sensor, antenna, receiver, transmitter, communications system, camera, GNSS system, GPS system, barometer, Inertial Measurement Unit (IMU), gyroscope, accelerometer, magnetometer, data transmission system, imagery transmission, cargo container, or payload container.

In another embodiment of the vehicle, the pivot motor comprises one or more worm and worm gear or lead screw mechanism.

In another embodiment, the vehicle further comprises a front pontoon attached to one or more front propulsion units and a rear pontoon attached to one or more rear propulsion units.

In another embodiment, the vehicle further comprises one or more body articulation pivot between the front pontoon and the rear pontoon.

In another embodiment of the vehicle, each of the front pontoon and rear pontoon is attached to two propulsion units.

In another aspect there is provided a method for operating a multi-mode convertible vehicle comprising at least three propulsion units, each propulsion unit comprising a propeller comprising a propeller hub, a propulsion motor connected to the propellor hub for rotating the propeller hub on the propulsion axis, and a wheel mechanically engageable with the propeller and rotatable on the propulsion axis, the method comprising: determining a mode of locomotion for the vehicle; and controlling at least one pivot motor connected to one or more of the propulsion units to adjust a pivot position of the at least one propulsion unit relative to the vehicle body.

In an embodiment of the method, the locomotion mode is aerial and the propulsion axis of rotation of the propulsion units is vertical or approximately vertical.

In another embodiment of the method, the locomotion mode is terrestrial and the propulsion axis of rotation of the propulsion units is horizontal or approximately horizontal.

In another embodiment of the method, the locomotion mode is aquatic and the propulsion axis of rotation of at least one of the propulsion units is vertical or approximately vertical and the propulsion axis of rotation of at least one of the propulsion units is horizontal or approximately horizontal.

In another embodiment, the method further comprises controlling one or more of attitude, path, travel, velocity, acceleration, object detection, object avoidance, and power and energy management of the vehicle.

In another aspect there is provided a convertible vehicle comprising: a vehicle body; a plurality of propulsion units, each propulsion unit having a propulsion axis and pivotally connected to the vehicle body by a support arm, each of the plurality of propulsion units comprising a propeller comprising a propeller hub and a propulsion motor connected to the propellor hub for rotating the propeller hub on the propulsion axis; and a pivot motor connected to at least one propulsion unit to adjust a pivot position of at least one of the plurality of propulsion units relative to the vehicle body.

In an embodiment of the vehicle, the propellor is optimized for propulsion operation in air and water.

In another embodiment of the vehicle, each propulsion unit further comprises a wheel comprising a wheel hub, at least one wheel blade, and an outer wheel rim, the wheel hub mechanically engageable with the propeller hub and rotatable on the propulsion axis.

In another embodiment of the vehicle, the wheel comprises a planetary gear and the wheel hub serves as a sun gear in the planetary gear.

In another embodiment of the vehicle, the propeller hub and wheel have engageable teeth.

In another embodiment of the vehicle, the wheel comprises a plurality of airfoil wheel blades configured for aquatic propulsion.

In another embodiment of the vehicle, when the propulsion axis is in a vertical or approximately vertical position relative to the vehicle body the propellor hub is rotated by the propeller motor independent of the wheel, and when the propulsion axis is pivoted in a horizontal or approximately horizontal position relative to the vehicle body the propeller hub and wheel are engaged and the propeller motor turns the connected wheel and propeller hub.

In another embodiment of the vehicle, each propeller hub is connected to a corresponding wheel in the propulsion unit through at least one gear.

In another embodiment of the vehicle, the propulsion unit further comprises a propulsion clutch configured to apply pressure to the wheel to connect the propeller and the wheel when the propulsion axis is pivoted in a horizontal position.

In another embodiment of the vehicle, the vehicle comprises three or four, or more propulsion units.

In another embodiment of the vehicle, the vehicle body is articulated.

In another embodiment of the vehicle, each of the plurality of propulsion units has its own pivot motor.

In another embodiment, the vehicle further comprises a landing gear.

In another embodiment of the vehicle, the vehicle body has neutral buoyancy in water.

In another embodiment, the vehicle further comprises one or more sensor, antenna, receiver, transmitter, communications system, camera, GNSS system, GPS system, barometer, Inertial Measurement Unit (IMU), gyroscope, accelerometer, magnetometer, data transmission system, imagery transmission, cargo container, or payload container.

In another embodiment of the vehicle, the pivot motor comprises one or more worm and worm gear or lead screw mechanism.

In another embodiment, the vehicle further comprises a front pontoon attached to one or more front propulsion units and a rear pontoon attached to one or more rear propulsion units.

In another embodiment of the vehicle, each of the front pontoon and rear pontoon is attached to two propulsion units.

In another aspect there is provided a convertible vehicle comprising: a vehicle body; a plurality of propulsion units, each propulsion unit pivotally connected to the vehicle body by a support arm and comprising: a propeller comprising a propeller hub; a propulsion motor for rotating the propeller on a propulsion axis; and a wheel reversibly connectable with the propeller; and a plurality of pivot motors, each pivot motor for adjusting a pivot position of one or more of the plurality of propulsion units relative to the vehicle body, wherein when the propulsion axis is pivoted in a vertical position relative to the vehicle body the propeller and wheel are disconnected and the propeller is rotated by the propeller motor independent of the wheel, and when the propulsion axis is pivoted in a horizontal position relative to the vehicle body the propeller and wheel are connected and the propeller motor turns the connected wheel and propeller, optionally, through the motorized unit.

In an embodiment, the propeller and wheel have engageable teeth.

In another embodiment, the propulsion unit further comprises a paddle configured to apply pressure to the wheel to connect the propeller and the wheel when the propulsion axis is pivoted in a horizontal position.

In another embodiment, the vehicle further comprises a retaining element to retain the wheel in a disconnected position from the propeller when the propulsion axis is pivoted in a vertical position.

In another embodiment, the vehicle further comprises landing gear.

In another embodiment, the landing gear further comprises a positioning arm which aligns with the wheel and supports wheel rotation when the propulsion axis is pivoted in a horizontal position.

In another embodiment, the vehicle body has neutral buoyancy in water.

In another embodiment, the wheel comprises a plurality of wheel blades.

In another embodiment, each of the plurality of wheel blades is an airfoil configured for aquatic propulsion.

In another embodiment, the vehicle further comprises one or more sensor, antenna, receiver, transmitter, communications system, camera, GNSS system, GPS system, barometer, Inertial Measurement Unit (IMU), gyroscope, accelerometer, magnetometer, data transmission system, imagery transmission, cargo container, or payload container.

In another embodiment, the pivot motor comprises one or more worm and worm gear, and lead screw mechanism.

In another embodiment, each propeller is connected to a corresponding wheel in the propulsion unit through a set of gears.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
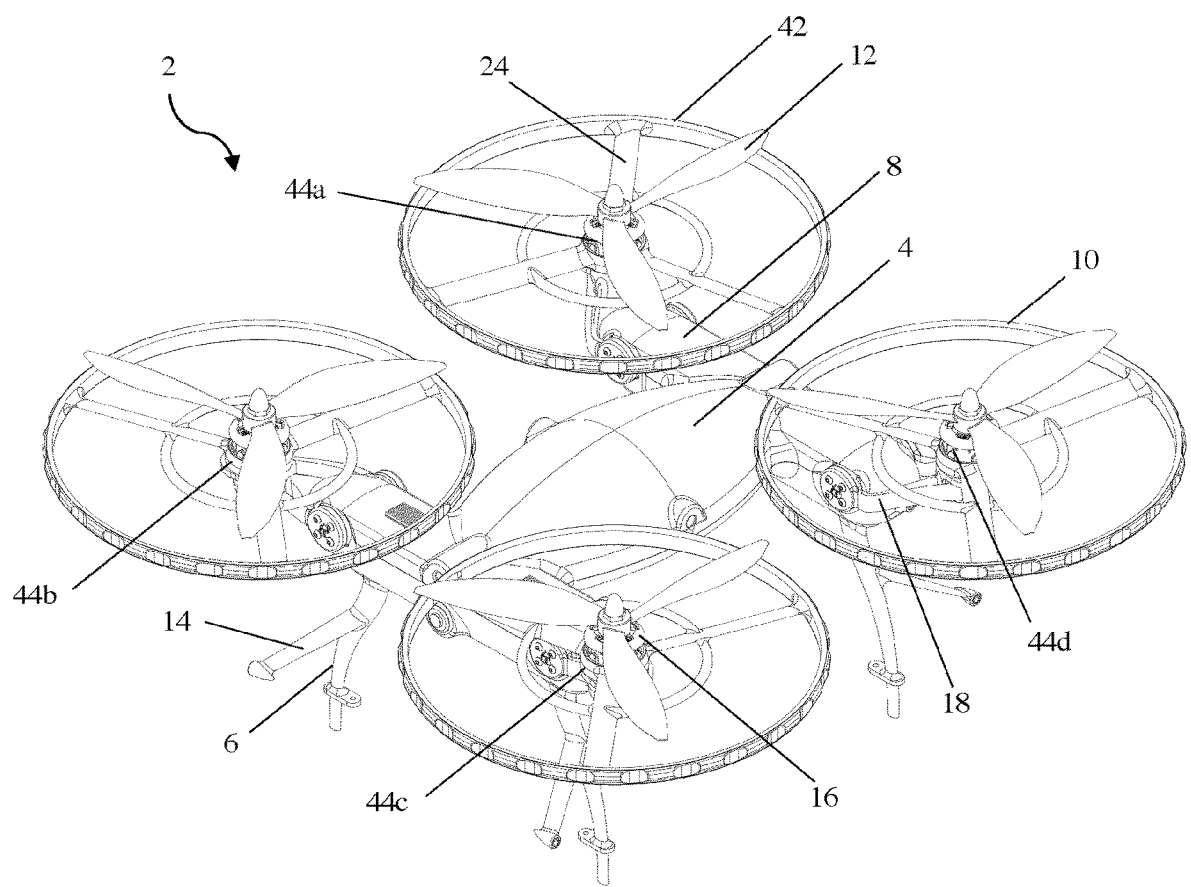
FIG. 1 is an isometric view of an embodiment of a multi-mode convertible vehicle in an aerial configuration.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprise" and any of its derivatives (e.g. comprises, comprising) as used in this specification is to be taken to be inclusive of features to which it refers, and is not meant to exclude the presence of any additional features unless otherwise stated or implied. The term "comprising" as used herein will also be understood to mean that the list following is non-exhaustive and may or may not include any other additional suitable items, for example one or more further feature(s), component(s) and/or element(s) as appropriate. As used herein, the terms "comprising," "having," "including" and "containing," and grammatical variations thereof, are inclusive or open-ended and do not exclude additional, unrecited elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the terms "about" and "approximately" refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein. When the term "approximately" is used in relation to a horizontal or vertical axis or plane, it is understood that the deviation can be +/−20 degrees from the horizontal or vertical axis or plane, respectively. When the terms "horizontal" and "vertical" are used herein, it is understood that the direction, axis, or plane referred to can also be approximately horizontal or vertical, respectively.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

Herein is described a convertible multi-mode vehicle capable of motorized travel in the air, on land, on water, and under water. The presently described vehicle is capable of controlled aerial flight, movement on the ground in terrestrial environments, on an aquatic water or other fluid surface, as well as in an aquatic medium such as underwater or within another fluid. The convertible vehicle can travel in a single of these domains, or in more than one, by changing between the different vehicle locomotion modes by adjusting the pivot angle of each of the propulsion units relative to the vehicle body. The vehicle can be manned, or unmanned, and can be piloted, auto piloted, or remotely controlled. The vehicle can also be controlled without any physical user action. A wireless transmitter or transceiver can also be utilized for vehicle control, or the vehicle may be equipped with internal pilot controls for controlling the vehicle from inside the vehicle body. Various control and sensor systems can also be provided to detect a change in required mode of locomotion and adjust the vehicle configuration appropriately.

Together with the vehicle body, the present vehicle has one or more sources of motive power and related systems, for example, motors and/or energy units supplying power and subsequently mechanical power to propellers and wheels, either directly or through a mechanical system which may also include different types of mechanical components and/or various gears, for movement in air, on and in water, and on land. A single propulsion motor for each one or a combination of different number of propeller and wheel propulsion units can be used to power all modes of vehicle operation. Pivoting motors enable a convertible configuration from one vehicle mode of locomotion to another.

FIG. 1 is an isometric view of an embodiment of a multi-mode convertible vehicle 2 in an aerial configuration. The multi-mode convertible vehicle comprises a vehicle body which can be used for travel or locomotion in air, on the ground, on water surface and underwater. The body is preferably waterproof and/or water resistant such that it is capable of housing water-sensitive equipment without exposure to water and such that it keeps water away from its insides to protect internal equipment from contact with water, humidity, dust, and other particulates. In another embodiment the totality, or part of the equipment itself inside the body can be made waterproof and/or water resistant. The vehicle body comprises one or more compartments for housing equipment, motors, electronics, payload, one or more energy source(s) such as batteries (or of other type), and possibly occupants, and/or cargo. Ducts and compartments in the vehicle body 4 may also be utilized for liquid flow and transfer.

The vehicle body shown in this embodiment has a central body with four pontoons 8 or pontoon-like protrusions at the four opposite extremities of said central body region, protruding in both directions, forming an approximately H shape with the central body, when seen from above. Optional pontoons 8 provide a support structure for the propulsion units 44a, 44b, 44c, 44d to position them at a sufficient distance from the vehicle body to enable the desired functionality and range of motion, including pivot motion of the propeller hubs 16 and rotational motion of the wheels 10 and propellers 12. Each propulsion unit can also be optionally connected to the vehicle through a support arm, or through a support arm connected to a pontoon. The pontoon-like bodies may present different possible shapes, and be in different possible directions, with a vehicle body being connected to or including a different number of pontoons and/or support arms, or combination of both.

The pontoons 8 may be rigidly connected, may be an integrated part of the vehicle body, or may be movable with respect to the vehicle body. In one embodiment, the pontoon 8 members may be movable through a mechanical and possibly motorized system, independent, or dependent on other mechanical systems in the vehicle, to provide for changing propulsion axis directions, for instance for operation, path achieving, and steering (articulated, pivot points). The shape of each pontoon is variable based on desired vehicle function, which may include an optimized hull shape which is hydrodynamically and also aerodynamically efficient, and each of the pontoons can be the same or different depending on the vehicle design. This enables efficient movement on and under water, on land and in air. Selected shape for such pontoons, and/or pontoon-like bodies, may be performed also to include aiding in the operation and efficiency of the propulsion system, for instance also streamlining air and/or fluid flow around them, minimizing flow block and/or drag, and/or aiding in the arrangement of such propulsion system for different configurations and/or modes of operation, for instance in air, on land, on and/or under water, or for when changing between different modes and/or operation configurations, path achieving, and steering. It is understood that other embodiments of the vehicle can have more or fewer than four pontoon structures, which may include for example three pontoon structures, or one or more sets of two contiguous pontoons with a propulsion unit connected at each end. In one embodiment, the body of the vehicle can also be made such that it is articulated, having one or more pivot points at which it can pivot two or more parts of the vehicle body. This can be used, for example, to improve setting the direction of propulsion units. An articulated vehicle body 4 may be used to stabilize, or improve stability of operation in flight, or to improve steering also in terrestrial and/or aquatic modes.

The top of the vehicle body may optionally have one or more protruding antennas, cables, wires, posts, structural components, and storage or protective compartments, which may be used to accommodate and house sensors, antennas, receivers, transmitters, cables/wires, electronics, for communications, data transmission, imagery transmission including image receiving and transmission, motors, cable reels, and/or cargo or payload. Areas of the vehicle body or compartments therein or thereon may be designed to accommodate, for example, cameras, radar, and other sensors, for example at any of its sides, and/or in the top and/or bottom halves of the vehicle body. The vehicle body may also have one or more physical input or output devices such as, for example, buttons, displays, lights, and indicators. Additionally, input and output devices can include one or more devices for receiving and/or transmitting wireless signals from the vehicle 2. One or more access ports in the vehicle body can also provide access to the inside of the vehicle body to accommodate, for example, passengers, cargo, and payload access. Other physical digital or electronic access ports can enable wired transmission of power and/or analog and/or digital information to and from the vehicle, for instance to enable retrieving data from the vehicle or transmit data to the vehicle, for programming electronic components of the vehicle by, for example using cables/wires, universal serial bus (USB) transmission, memory cards, or other data transfer mechanisms, as well as one or more electronic connection point to install or remove hardware, or power or energy sources, for instance batteries or to recharge such batteries. The vehicle body may also comprise one or more compartments or attachment points on its outside, or inside for accessory attachment, such as cargo containers, passenger areas, or payload containment. Preferably the vehicle body is fully waterproof and designed to be streamlined for aero and hydro-dynamically efficient propulsion.

The vehicle 2 has an architecture with a central control system including software and hardware and optionally one or multiple peripheral units which may include additional software and/or hardware. For electronic control and operation the vehicle comprises a control system having one or more microcontroller and/or onboard computer to perform actions that can include, for example, receiving and/or transmitting control instructions and/or receiving and transmitting data, to control the positioning and operation of the vehicle including attitude, path, travel, velocities, accelerations, object detection and avoidance, maintain distance to other vehicles, the pivot motors and propulsion motors, power and energy management including management of energy sources and their use, and/or optionally including devices in the payloads and cargo. The control system is responsible for general vehicle control, including the control of optional peripheral units, and may also include partial or total vehicle communication and sensor control. In an embodiment, one or more optional peripheral units can be dedicated more specifically to operation while the vehicle is performing in each of its different modes, for instance, in between different modes, to more specific control of the vehicle in each of its modes of operation in air, on land, on water and underwater. The same may also be performed by the central control unit without a peripheral unit. In an embodiment, the peripheral units can also be activated or put in sleep mode, hibernated, or partially, or fully deactivated by the central unit.

The control system controls the pivot motors and propulsion motors for mechanical motion, in addition to any other mechanical components in the vehicle. The mechanical and motor system of the vehicle 2 can include one or more motors such as DC, AC, servo motors, and stepper motors, etc., as well as one or more gears, mechanisms, energy and power sources, and control and distribution systems. Vehicle control may also be performed with the use of electrical, mechanical and/or hydraulic or pneumatic systems. The vehicle also preferably has an inertial measurement unit (IMU) to measure vehicle states used for feedback stabilization. The IMU may consist of one or multiple individual inertial measurement units, centralized in the same location, or distributed, in different positions in the vehicle. Other sensors may also be included such as one or more barometric pressure sensors, magnetometers, temperature sensors, radar, and cameras. The vehicle can also have one or more other peripheral devices, such as, for example, manipulators such as robot arms, one or more transceiver(s) to receive and transmit wireless information, for instance from and/or to earth orbiting satellite(s), to and/or from re-transmitting antennas and other equipment, ground station(s), traffic control, or other vehicle(s) for example for data logging as well as for issuing, or receiving motion commands.

Various modes of operation are controllable from the control system including the pivot position of the propulsion units through the pivot motors and propulsion operation through the operation and control of the propulsion motors to control flight, land, water (or liquid) surface and underwater propulsion operation. The control system can also have one or more additional stabilization and/or enhanced stabilization systems such as partial or full autopilot, any sensors and systems, cameras, radars, positioning systems, or parts thereof, such as global positioning sensors (GPS) and/or other global navigation satellite system (GNSS), or localized, indoor positioning systems, communications and transmission systems (analog and/or digital), and vehicle and onboard communication systems.

The control system may also include autopilot equipment, manned pilot equipment, and/or local or remote piloting and/or assistance, which may also include vehicle stabilization, object detection and/or collision avoidance, radar, and vehicle control, in between others, in its different modes of operation. The vehicle control system can also be designed to account for possible lighting, electrical, electronics, mechanical systems, automation, safety, passenger comfort including seats, instrumentation boards, and screen systems. Power to the vehicle may be derived from one or more fuel-liquid, solid, or gas, battery or batteries or fuel cell, and may be tethered, or untethered.

Figure 3:
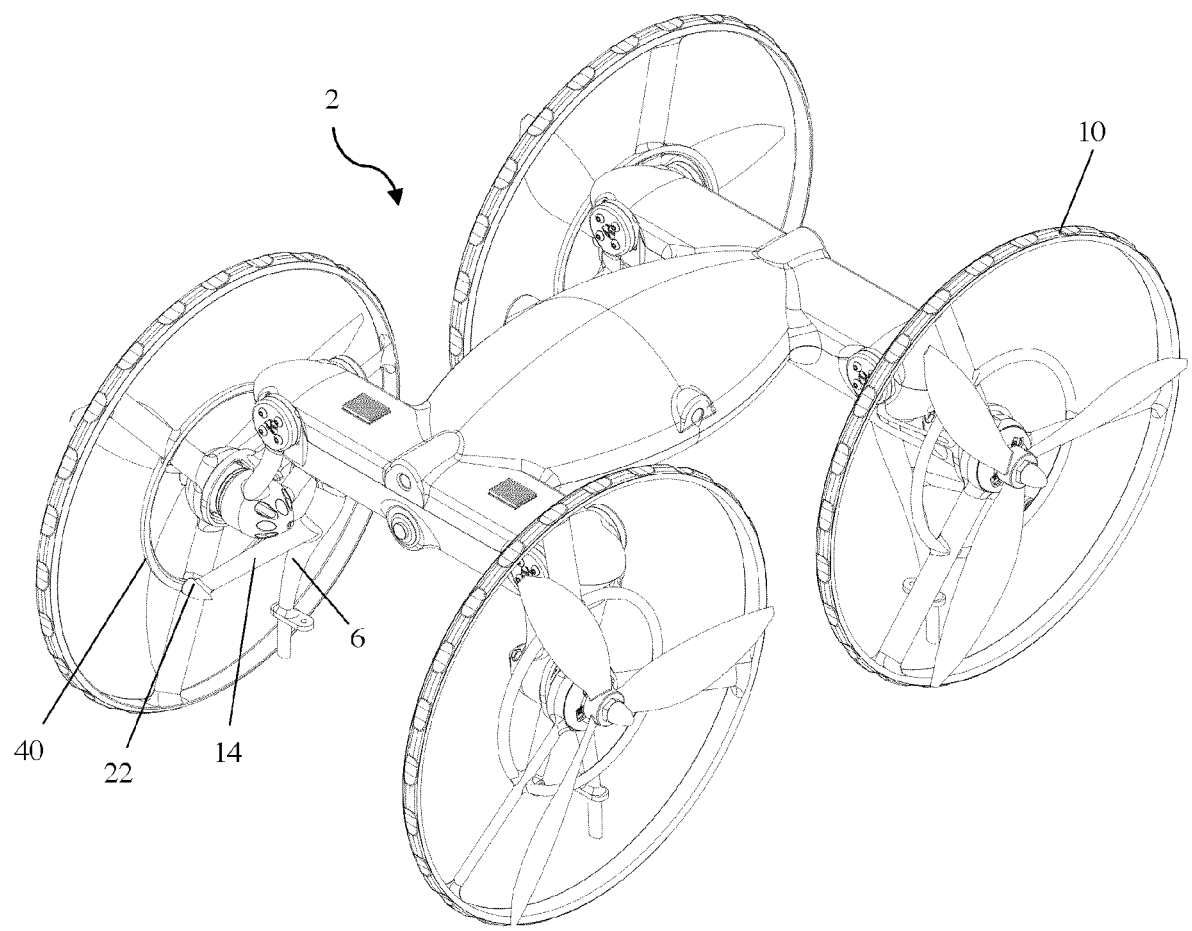
FIG. 3 is an isometric view of a multi-mode convertible vehicle in one embodiment in a terrestrial configuration.

The vehicle body 4 may also be attached to one or more optional landing gear 6 structure to support the vehicle on the ground when not in land travel mode. The landing gear 6 can also simultaneously and optionally be used as guides for the vehicle wheels through one or more positioning arm 14 connected to the landing gear 6. The landing gear 6 structures can be connected to the vehicle body and can support the vehicle body off of the ground when the vehicle is on land in an aerial mode, when the propulsion axis of each propulsion unit is in a vertical position (or approximately vertical position) such that the propeller is horizontal (or approximately horizontal) relative to the ground. The landing gear 6 structures can also optionally include or be attached to one or more of a set of structures enabling the vehicle to safely land. The positioning arm 14 can also be used for making contact with the wheels when the wheels are in or approximately in a vertical position and the propulsion axis is parallel or approximately parallel to the ground, as shown in FIG. 3. The positioning arm 14 can also optionally include one or more friction-reducing elements such as, for example, one or more rollers at the point of contact of the wheel to reduce friction as the wheel is turning but still providing a locus of support. The structure and shape of the positioning arm 14 can be purposely designed to support adequate and supported landing, movement on land, on and under water, and the appropriate contact of anti-friction elements with the correct region of the wheels, as applicable.

In one embodiment, the vehicle body 4 may be equipped with detachable small enclosures either at its bottom, top, or side regions. These can optionally be enabled to be released from the body of the vehicle when in flight, or while moving on the ground, or on, or under water. Particularly these detachable enclosures may be dropped along the path of a vehicle in communications and/or GNSS denied environments, such as inside buildings, underground, etc. Enclosures can include, for instance, communications electronic equipment and/or GNSS antenna/receivers or other locating beacons or location identifiers, or other sensors, and/or electronics. Multiple enclosures can be carried by a single vehicle and can also be used, for example, as communication relays, forming a network consisting of a mesh of nodes, similar to or even using ZigBee or other type of communication protocol and their respective electronic equipment boards. In a normal operation, as the vehicle starts sensing lower levels of reception of communications and/or GNSS, it could drop such a small enclosure, the first of possibly several enclosures to be deployed. Such a first enclosure to be deployed may be similar to all other enclosures, or it may be the only of such set of enclosures carried by a vehicle to include a GNSS receiver antenna, beyond the digital communications electronic equipment present in all such enclosures. After dropping an enclosure, the vehicle will monitor communication network intensity levels with deployed enclosure, dropping another enclosure when communications reception becomes unstable or low. This process is then repeated as needed. In this way, communications from and to the vehicle are guaranteed at all times. Furthermore, with the vehicle body containing an IMU, it is then possible to determine the exact relative position of the vehicle in a GNSS denied environment with respect to a deployed enclosure. With such a deployed enclosure having a GNSS antenna receiver, and therefore enabling its position to be known at all times, it is possible to determine the absolute vehicle position at all times. Furthermore, the vehicle can monitor communication network intensity levels with deployed enclosures and through this, approximate distances from the vehicle to the different deployed enclosures can be estimated. Through triangulation algorithms, the position of the vehicle can then be determined. Either of these two methods, IMU, or triangulation based, or any other known to a person skilled in the art, can be used individually, however, determined positions by any of these methods can be affected by imprecisions. Precision of positions determined by the IMU based method can be affected by errors in, for example, gyroscope measurements, for instance influenced by noise and drifting, particularly relevant in slow movements; accelerometer measurements, due to incorrectly determined inclinations and considerable acceleration movements, and errors in integration; magnetometer measurements, due to the influence of local magnetic fields (materials, etc.) The precision of results obtained from the triangulation based method may be influenced by obstructions in the direct line of travelling of communication waves between the vehicle and an enclosure, for instance. The precision of the vehicle's position in a GNSS denied environment can also be improved by utilizing one or more different positioning or localizing methods and combining the respective results from each method.

In an embodiment, each propulsion unit in the vehicle comprises a mechanical system capable of changing the orientation of each propeller and wheel set, independently, or in sets of connected propellers and wheels. The mechanical system in each of the propulsion units can be on the vehicle at variety of positions, such as mounted onto the pontoon(s) 8, connected to the vehicle body through one or more support arms, or mounted inside these body elements, or mounted directly to the body. Different mechanical systems can be used in the pivoting unit and the propulsion unit as desired. In one example in a particular embodiment, the mechanical system of the pivoting system can comprise one or more servo motors. In another embodiment, an electrical motor is applied, with or without a gearbox connected to its output axle. The output axle of the motor, or gearbox, can then be connected to a worm, which in turn is engaged with a worm gear or worm drive. In a possible configuration, the worm is aligned with the longitudinal direction of the pontoon containing it, while the worm gear is part of an axle, transverse to the worm and pontoon. The axle connected to the worm gear, or the output of the applied mechanical system, or servo, or stepper motor in another embodiment, can then be attached to one or multiple structural components, to the propeller/wheel sets and/or respective motorized system, for example, the motors giving motive power and connected to propeller/wheel sets. In another embodiment, a lead screw mechanism or a slider mechanism may be used instead of a worm or worm gear, or alternatively a servo or other gear or mechanical system may also be used. In one embodiment, at each propulsion unit 44a, 44b, 44c, 44d there is a set of propulsion elements comprising one propeller for air, one propeller for water (or other liquid or fluid) and one wheel. In another embodiment, multiple propulsion elements, or part of multiple propulsion elements, may have multiple functionalities, for example the propulsion unit may comprise one propeller optimized both for propulsion operation in air and water replacing a single purpose propeller for air and another for water. In another embodiment certain vehicles can have a bespoke wheel and propellor design based on the primary use of the vehicle. In other embodiments not all propulsion units need to be utilized. A propulsion element, as referred to herein, refers to the rotating element that causes vehicle propulsion in the mode of locomotion of the vehicle. For example, an example propulsion element for locomotion in air is a propeller or airfoil or similar element, an example propulsion element for locomotion on the ground is a wheel or similar element, and an example propulsion element for locomotion in water is a propeller, hydrofoil, turbine or similar element.

The propulsion unit comprises one or more motors optionally connected to one or more mechanical systems, which may also include gears, or gear sets, which command the orientation and speed of the propellers. If the wheels are connected with the propellers then the propulsion motor will also command the orientation and speed of the wheels in addition to the propellers. Control of each propulsion unit can also control their motive system, power systems, and provide general control of the propulsion motor and their propulsion direction. The control settings for each propulsion unit can be independently controlled by the control system which can be changed and set according to vehicle mode requirements, automatically, or by user inputs, during, before or after operation.

Propellers can be designed for optimal performance in air, or water, or parametrically for a combination of both and respective propulsion usage components, such as by percentage or required or desired efficiency. The propellers designed for propulsion generation in air are very efficient at air propulsion however are not as efficient for generating propulsive force at water surface and/or underwater, and vice versa. In one preferred embodiment, the propellers can be optimized for both air and water and are a different component and separated from the wheels. In an example, the propellor can have blades in an aerofoil or hydrofoil optimized shape for considerably helping propulsion in water. In another embodiment the wheels can serve a double purpose of providing a surface for engaging with the ground in the vehicle terrestrial mode, and can also be used for air and/or water propulsion via specially designed wheel blades. The wheel blades, which can be integrated in the wheels, can thereby serve both as support spokes for the wheels (arc) in the terrestrial configuration, and also have an airfoil shape for propulsion when the vehicle is in aquatic mode and traveling either on water or under water. The combination of radial wheel blades on each wheel, or specifically on each wheel that provides propulsion in or on water, can act as an efficient turbine or water propeller to use the motive force provided by the propulsion motor to propel the vehicle in or on water. In this embodiment, the wheels with wheel blades serve as highly efficient propellers for generating propulsion in water. In this embodiment, each propulsion generation set or propulsion unit comprises a first propeller 12 for propulsion of the vehicle optimized preferably in air, and a separate water propulsion propeller wheel 10 with wheel blades 24 that are configured specifically for water propulsion. A single propulsion motor inside each propulsion unit can control both the propeller 12 and wheel 10 depending on the vehicle mode and whether or not the propeller 12 and wheel 10 are fully connected or not. As such, the present vehicle configuration can provide a single propulsion system powered by a single propulsion motor which can effectively select which propeller system to use based on the mode of operation. This can further provide more efficient use of the power supplied to the vehicle and enable an efficient propulsion system for water surface and/or under water operation in addition to an efficient propulsion system for aerial operation and land operation.

In one embodiment, the wheel blades 24 are connected to a full (as shown) or partial outer wheel rim 42 with optional wheel treads on the outside of the wheel rim to improve ground engagement in the terrestrial vehicle mode. The wheel design can also be used to improve the propulsion system efficiency making difficult the escape of fluid flow from wheel propeller disk around the wheel blades, which serve as propeller blade tips. This design can also decrease the generation and/or intensity of blade tip vortices complicating fluid flow which increase wheel propeller rotational drag, and decrease propeller efficiency on generating propulsive force, as well as a track of a wheel for land movement. Wheel dimensions can also be changed, for example by radius and width, to optimize vehicle operation. In the embodiment presented, wheels also offer protection against damage to or from rotating propellers. Wheels can also have different surface treatments to provide more or less friction during vehicle operation to optimize movement in any locomotion mode.

For flight, the presently described vehicle uses an efficient propeller for air operation with two or more blades, while minimizing inertia and/or mass, maximizing flight and/or propulsive efficiency, minimizing power and/or energy use. This enables efficient use of available energy and power to the vehicle, minimizes the size and weight of available energy sources, and minimizes weight by using only a single motor for all forms of propulsion. Thus a converging cyclic mechanism is provided with reduced need for flight power and less weight, leading to increased flight endurance, range, power, and control. This further enables the application of changes of mode and control in a fast manner to the rotation of the flight propellers, applied power, generated flight propulsion/propulsive force, and flight power needed for operation, control and/or stabilization purposes in flight. To enable such, and as described previously, a single motor can be used for flight propulsion, water/fluid propulsion and/or wheel for land propulsion. During flight, only the flight propellers will be mainly actuated, and a retaining element can optionally be provided to retain the wheel in a disconnected position from the propeller when the propulsion axis is pivoted in a vertical, or quasi-vertical position and the propulsion unit is in a flight mode configuration. The retaining element can have, for example, one or more magnet and/or mating magnetic surface, hook, latch, or other releasable connective element. Since flight propellers need to rotate at relatively high rotation speeds, which requires flight propellers to be extremely precisely well balanced, isolating the wheel portion from the propellers enables better control as well as power use efficiency. If dedicated water/fluid propellers and/or wheels would also be powered and rotating while the vehicle is in flight, at same relatively high speeds as and/or with flight propellers, these elements would also be required to be precisely well balanced, which makes it a difficult task and considerably increases the complexity and cost of such components, including manufacturing and precision control. Furthermore, considering that a wheel can have contaminated particles attached to its track after rotating and touching the ground, this can offset the wheel balance which can throw off propeller air control. In particular, if components rotating at relatively high rotation speeds are not precisely well balanced, vibrations can be generated which, beyond creating imprecisions and difficulty in the application of propulsion forces, control and/or stability, will with considerable probability lead to fatigue of rotating elements, connected power units and/or attached structures. It is the experience of the inventors that this can also lead to catastrophic failure consequences. In an optimal embodiment, only flight propellers, efficient for generating propulsion in air, are connected to the motor/power unit, while the vehicle is in flight. In particular, in a flight mode dedicated water/fluid propellers and/or wheels can be disconnected from the motor/power unit and therefore will not move with, or proportionally with, the flight propeller and motor/power unit.

In one preferable embodiment, a mechanism is used to connect the flight propeller 12 with the water propeller/wheel to the motor/power unit when and while the propulsion unit is being rotated from a flight configuration with the propulsion axis in a vertical or quasi-vertical position and flight propellers oriented in, or approximately in a horizontal plane, to a land operation configuration where the propulsion axis is in, or approximately in a horizontal position and the flight propellers are oriented in, or approximately in a vertical plane. The same mechanism can be used to operationally connect the wheel and propeller when some or all of the propulsion units are pivoted, for water operation, such that the propulsion axis is in, or approximately in a horizontal position and the flight propellers are oriented in, or approximately in a vertical plane. In an embodiment, when the propulsion unit is being pivoted from a horizontal or quasi horizontal propulsion axis to a vertical, or quasi vertical propulsion axis, the water propellers and/or wheels are disconnected from the motor/power unit. Also, as air propellers, propellers for water surface and/or underwater operation may have two or more blades and as for air propellers, their blades may have different shapes, such as, for example, airfoils, such as chords, taper, angles, with different incidence, attack, sweep, twist, advance, which may also change differently radially in different propellers with different configurations. In one embodiment, a propeller may be optimized for use in air and water, upon a preferred percentage of use in each of the different domains. For example, water propellers may have the blade tips connected to a full or discontinuous section of a ring or outer wheel rim, which can be used as a track of a wheel for land movement, with the propeller blades being used as spokes for the wheel.

The vehicle disclosed herein may be used in leisure activities, as well as civilian and military operations, which may include but are not limited to transportation, surveying, exploration, monitoring, inspections, security, tracking, patrolling, law enforcement, defense systems, training, safety, search and rescue, fire detection and fighting, disaster management, mapping, filming, data acquisition, communications, broadcast, reconnaissance and surveillance, in between others. Other applications may also include infrastructure monitoring, smart agriculture, border patrol or control, coast patrol, water patrol, coast guard, fisheries, intelligence, surveillance and reconnaissance (ISR) missions, using onboard camera(s) and/or other sensors (ex. radars, infrared, range sensors and others), carry payload, package delivery, sensing IEDs and landmines in the battle field, border surveillance, in mining/oil/gas, hydro power generation and transmission inspections, monitoring, space exploration and others.

Figure 2:
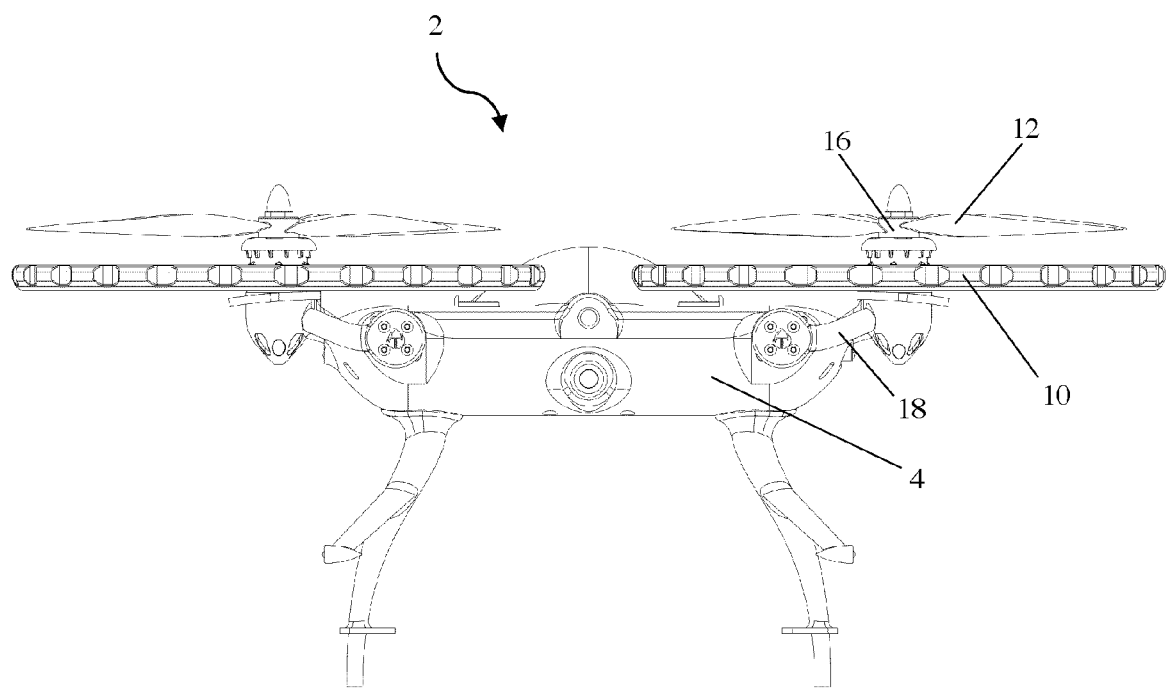
FIG. 2 is a side view of a multi-mode convertible vehicle in one embodiment in an aerial configuration.

FIG. 2 is a side view of a multi-mode convertible vehicle 2 in one embodiment in an aerial configuration. In this embodiment, the vehicle has multiple propulsion units which each having a pivot motor for adjusting a pivot position and the required propulsive force direction in 3D space of the propulsion unit relative to the vehicle body, a propeller 12 on a propeller hub 16, a propulsion motor for rotating the propeller on a propulsion axis, and a wheel 10 reversibly connectable with the propeller. In other embodiments more than a pivoting motor may be used. Each propulsion motor is electrically connected to one or more power unit(s) and/or energy source(s), possibly in the vehicle body 4. In one embodiment, in flight, the vehicle assumes a quadcopter configuration. In one embodiment, the vehicle will have the motors positioned at the corners of a rectangular, or quadrangular shape, when seen from above, in the plane of the vehicle's body, at, or close to the corners of the vehicle body, or on the extremities of said pontoons and/or extending from the vehicle through one or more support arm 18. In flight, the propellers will be approximately in a plane parallel, or close to parallel to the plane of the vehicle body and the propulsion axis of rotation of the propulsion unit will be substantially vertical. This enables generation of propulsion forces in or approximately in a vertical axis. Vehicle translation and/or rotation, control and/or stabilization, can be achieved by varying generated thrust force overall and/or differentially of one or more propulsion units with respect to other(s). The front of the vehicle, i.e., the side of the vehicle facing the direction of movement can also be changed using the control system.

FIG. 3 is an isometric view of a convertible multi-mode vehicle 2 in one embodiment in a terrestrial configuration. In one embodiment, in land or terrestrial mode, the wheels will be oriented in a plane perpendicular, or close to perpendicular to the vehicle's body plane such that each of the wheels touches the ground. The wheels 10 can be in a vertical plane, or close to vertical, or at an angle which maintains wheel contact with a terrestrial surface, and the propulsion axis of rotation of the propulsion unit will be substantially horizontal. In land or terrestrial mode, the vehicle can move forward or backwards and steering may be achieved by differential thrust to different wheels, in different sides of the vehicle, or by changing the orientation of the plane of the wheels. Different or additional mechanical systems can also be used to achieve controlled mechanical steered motion including, but not limited to one or more motors, gears, linkages, servo motors, etc. In this embodiment, landing gear 6 has a positioning arm 14 to engage with the inner wheel rim 40 but still enabling the wheel 10 to rotate freely. In one preferred embodiment the positioning arm 14 comprises a friction-reducing element 22 which can make contact with inner wheel rim 40 but still provide low friction movement. In one example, the friction-reducing element 22 can comprise one or more ball rollers, bearings, or ball plungers. In a particular embodiment, the positioning arm 14 can also guide the wheels in their engagement movement when being rotated from the plane of the vehicle to a perpendicular plane and while connecting to the propulsion system.

Figure 4:
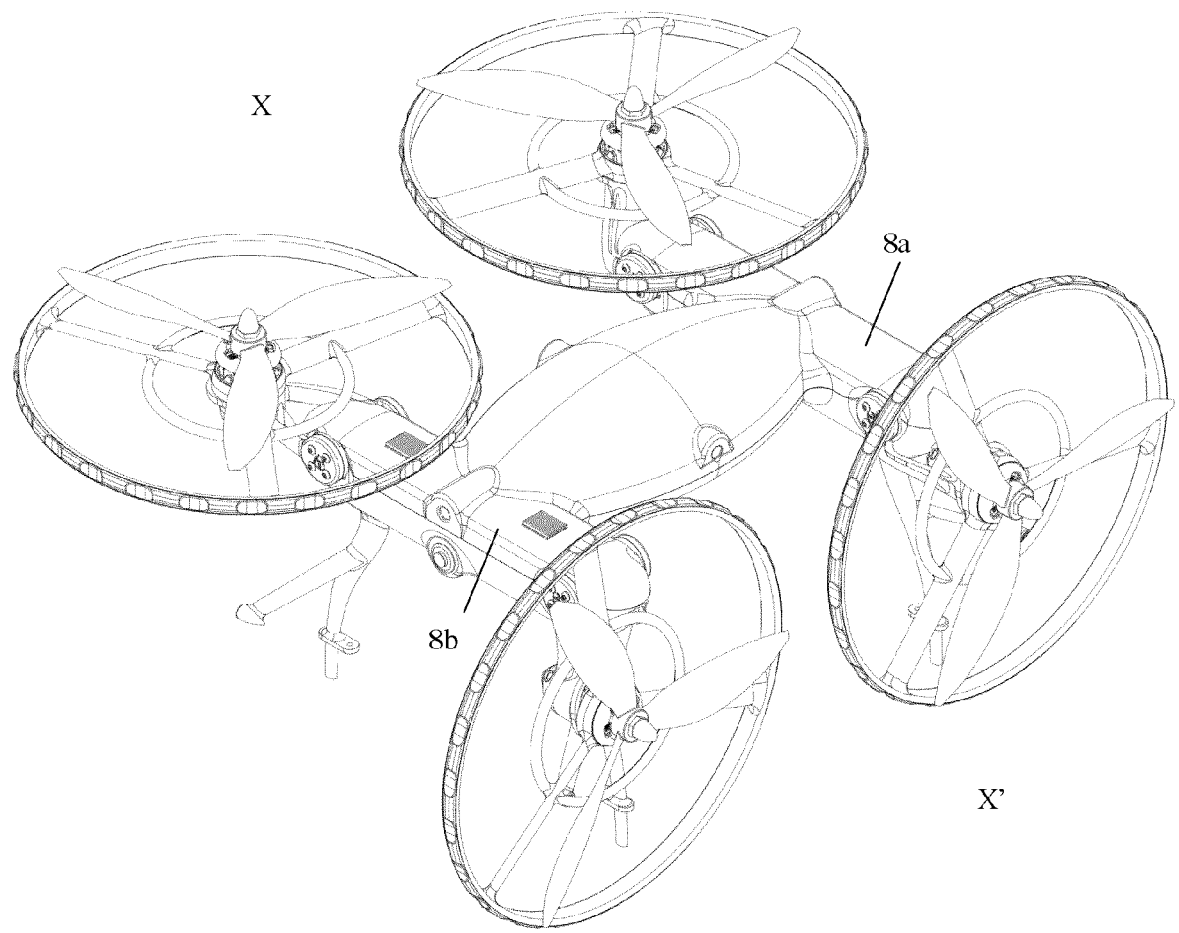
FIG. 4 is an isometric view of a multi-mode convertible vehicle in one embodiment in an aquatic configuration.

FIG. 4 is an isometric view of a multi-mode convertible vehicle in one embodiment in an aquatic configuration. In one embodiment, the vehicle may be neutrally buoyant, or close to neutrally buoyant. The vehicle can also assume different front facing sides, meaning that different sides of the vehicle can be oriented facing the direction of travel. This can be achieved in the same mode, or in different modes as desired. In one embodiment, for water modes, such as water surface and underwater modes, different propulsion units comprising propeller and wheel sets can be pivoted in different orientations, with the pivot angle of the propulsion axis adjustable anywhere between vertical and horizontal. In one embodiment, two propulsion units on one side of the vehicle can be pivoted by the pivot motor such that they are oriented in a plane parallel or close to parallel to the vehicle's body plane and the propulsion axis perpendicular or close to perpendicular to the ground (side X), while the other propulsion units on the other side of the vehicle body can be oriented in a plane perpendicular, or close to perpendicular to the plane of the vehicle's body such that the propulsion axis is in line with the pontoons (side X'). In this embodiment, during aquatic travel, the first two propeller/wheel sets or propulsion units on the X-side will provide for pitch and roll of the vehicle, while the second set of propulsion units on the X' side provides for thrust and yaw.

In the embodiment shown, the vehicle comprises a body with pontoons 8a, 8b at its extremities. Such pontoons can be used for travel on water surface and underwater and can also optionally have an airfoil shape, with each pontoon further optionally forming a wing to create lift in flight, improving efficiency of the vehicle in translational flight. In addition, the body can comprise an apparatus capable of controllably allowing water in during submersive underwater travel to control buoyancy during swimming. The vehicle can also have a detachable buoy enclosure to maintain communications with an external system, which may include for control, data, imagery transmission, and/or satellite communications, in between others, and/or connection to GNSS, when the vehicle is submerged. This buoy enclosure, which can be part of the vehicle's body when in flight, on the ground, and on the water mode. The buoy can also potentially stay afloat due to its buoyancy and be released from the body when the vehicle submerges. This buoy enclosure can also be attached to the vehicle body through a tether which, besides maintaining the buoy enclosure physically connected to the vehicle body, for example through a cable, can also enable power and data transmission between the vehicle and buoy enclosure. This tether can be collected inside the vehicle body, or outside at the top of the vehicle body, or in another part of the vehicle body, for example in a box at the top of the body, by a mechanism inside the vehicle's body, or outside, similarly to a retractable cable reel mechanism with a weak spring, and/or connected to a motor. This allows for the buoy enclosure to stay afloat, due to its buoyancy, while the vehicle submerges, with the tether extending, being unreeled from the reel. A weak spring mechanism can be employed whose force is small when compared to the buoy enclosure's buoyant force, and/or a motor which may be, for example, a stepper or other type of motor and related encoders. The buoy may also have one or more angle sensors, position sensors, or related systems, for sensing angular or position displacements in the motor axle, and/or cable reel. A spring mechanism and/or motor can enable the tether to be reeled in, to the inside, or to inside a box part of the body, or close to the body of the vehicle when the vehicle ascends and as it gets closer to the buoy enclosure, being able to pull the enclosure and reattach it to the vehicle body after the vehicle and buoy enclosure are in close proximity. Said buoy enclosure may contain, for example, antennas and electronic components for communications of different data, e.g. vehicle, sensor data, etc., for instance which may include, but not only, video and camera feed and imagery, IR, etc., and for connection to GNSS, and as well to possibly receive commanding controls. The buoy enclosure may also contain an inertial measurement unit (IMU) which can include one or more gyroscope, accelerometer, and magnetometer, and/or other sensors and related systems. The same or duplicated sensor systems may also be contained in the vehicle body.

Between sensors in the vehicle body and/or in the one or more buoy enclosure, the vehicle can be configured to be reachable and be capable of communication at all times. In an embodiment where the buoy enclosure has a IMU and the vehicle body also contains an additional IMU and an external pressure measurement sensor, and knowing the sensed angular displacement of the motor output axle and/or reel therefore knowing the length of the released tether from vehicle to the water surface, it is possible to run differential algorithms, for example a recursive Bayesian filtering such as a Kalman filter algorithm, extended Kalman algorithm, or particle filter algorithm, to determine the exact relative position of the submerged vehicle with respect to the buoy enclosure. In a preferable embodiment the position of the buoy enclosure can be known at all times, such as by incorporation of a GNSS reception antenna or wireless communications system with an onsite or remote operator, this enables the exact position of the submerged vehicle to be known at all times.

Figure 5:
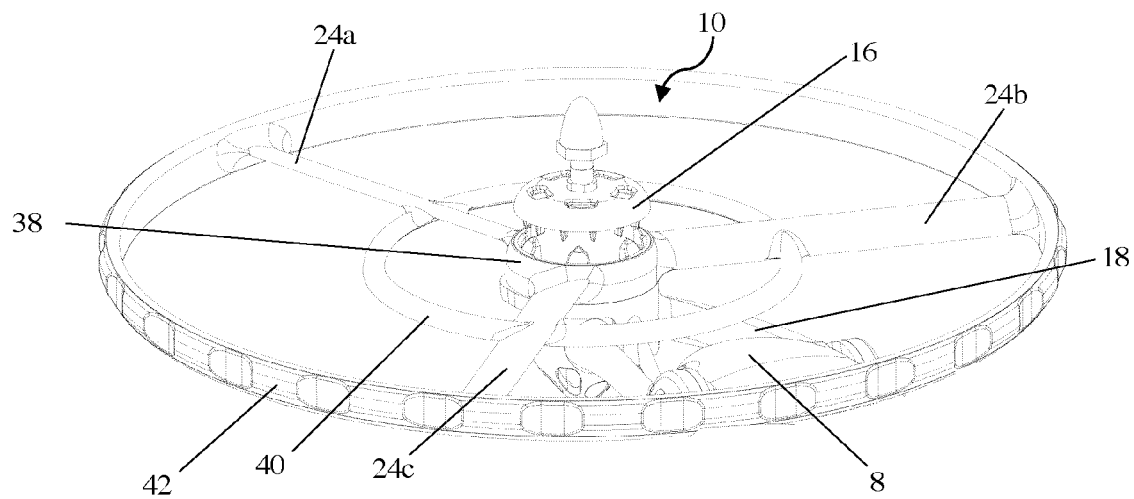
FIG. 5 is an isometric view of a wheel and propeller hub embodiment.

FIG. 5 is an isometric view of a wheel 10 and propeller hub 16 embodiment in a propulsion unit for a multi-mode vehicle. In the embodiment shown the tip of a pontoon 8, or pontoon-like element is connected to a rotational element or propeller hub 16 through a support arm 18. Connected to the propeller hub 16 is a propulsion motor connected to a power unit for providing power and rotation to the propeller (not shown). One embodiment for a combination wheel 10 and/or water propeller is also depicted. In this configuration the water propeller or wheel 10 has three wheel blades 24a, 24b, 24c at predefined radially varying incidence angles. Each wheel blade 24a, 24b, 24c has a twist, sweep, taper, and chords to provide propulsion efficiency for on-water and in-water operation. In this configuration, the wheel blades 24a, 24b, 24c also serve the function of spokes connecting the wheel hub 38 to provide support for the wheel 10. It is understood that the wheel preferably has at least three wheel blades, but can have as few as one or two and more than three. In this case the wheel 10 is shown with a full rim extending fully along the wheel diameter, which is used as a wheel track and is connected to the wheel hub 38 by the wheel blades 24a, 24b, 24c.

An inner wheel rim 40 is also shown, which serves to add structural integrity and stability of the wheel 10 structure and/or water propeller elements or wheel blades, while also providing a guide for rotation of the wheel and/or water propeller element when connected to the motor and rotating with it. It is noted that when the wheel has an inner wheel rim 40 the wheel blades can extend at various locations between the wheel hub 38 and inner wheel rim 40, and between the inner wheel rim 40 and outer wheel rim 42, and may not necessarily be continuous from the wheel hub 38 to the outer wheel rim 42. In a different configuration where a terrestrial mode is not desired for the vehicle, the wheel 10 can simply comprise the airfoil wheel blades without an outer wheel rim 42, or not be present at all, as flight propellers may not be present if flight mode is not desired, or aquatic propellers if aquatic mode is not desired. The inner wheel rim may also serve to assist in maintaining a steady plane of rotation of these elements. In particular, when the wheel is in a vertical, or quasi vertical position for terrestrial motion, the inner wheel rim can be positioned to be in contact with the landing gear having an optional positioning arm to provide additional support. The landing gear or optional positioning arm can further comprise one or more low friction connection points to allow the wheel 10 to turn freely while still providing structural support. In particular, one or more roller elements, for example ball rollers, bearings, ball plungers, or of other type, can be positioned at the connection point on the landing gear or positioning arm, or on the inner or outer rim of the wheel, to reduce friction as the wheel and/or water propeller is turning. In the configuration depicted considerable free space is left in the wheel and/or water propeller disk, to enable free air flow through it, being generated by the flight propeller when rotating in aerial mode.

The wheel hub 38 and propeller hub 16 are shown disconnected in an aerial mode. In a connected position, in one embodiment, teeth or protrusions, or cavities on the wheel hub 38 engage with cavities and/or teeth or protrusions on the propeller hub 16 to functionally connect the two components such that power supplied to the propeller hub 16 is transferred to the wheel hub 38. The inner diameter of the wheel hub is slightly bigger than the outside diameter of the motor. In this way, the wheel hub is not forced to rotate with the motor unless the teeth are engaged. Other engagement means to connect the wheel hub with the propeller hub are also conceivable, such as, for example, using magnets, or springs, forks, paddles, clutching elements, or other elements. In an embodiment the wheel can be loosely connected to the propeller and/or provide a gear ratio that creates slower rotation, slippage, for example by way of a clutch plate, geared arch, planetary gear, or engaged teeth. The gear ratio can also provide more or less torque as desired, or also such as by applying a clutch such as a paddle or fork to clutch a gear mechanism.

Figure 6:
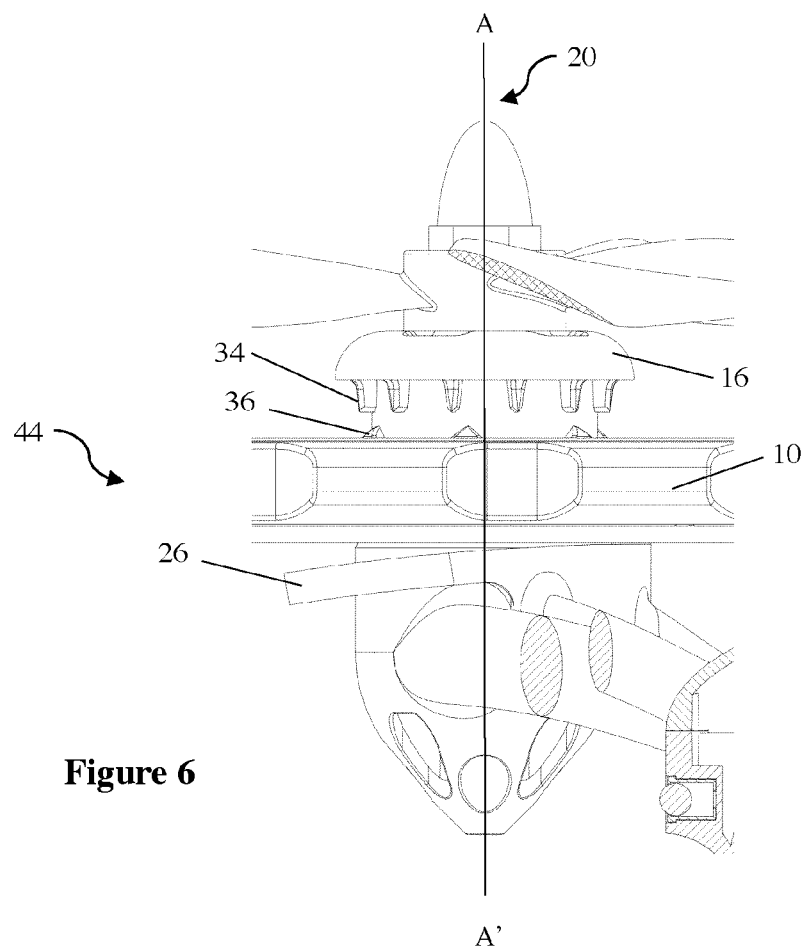
FIG. 6 is a close-up side view of a propulsion unit showing a propeller hub and wheel connection embodiment with propulsion axis of rotation.

FIG. 6 is a close-up side view of a propeller hub and wheel connection embodiment in a propulsion unit 44. A motor inside the body of the propulsion unit may include or be connected to the propeller hub 16 where propeller hub teeth 34 have appropriately sized gaps to engage with wheel hub teeth 36. Paddle 26 can provide support and/or pressure to engage the propeller hub teeth 34 with the wheel hub teeth 36 when the propulsion unit is being pivoted from a flight configuration with the propulsion axis of rotation 20 at A-A' in a perpendicular position to a downward or more horizontal position of the propulsion axis. In a water mode configuration, with water propellers and/or wheels being in a plane vertical, or approximately vertical, the paddle can support the engagement of the wheel hub to the propeller hub 16. When the teeth are pushed into cavities in the mating structure, the motor unit is connected also to the wheel 10, with these moving with the motor. Oppositely, in an optimal embodiment, when the propulsion unit is being rotated in an opposite direction with respect to the previously mentioned one, the wheel with aquatic propulsion wheel blades are disconnected from the motor/power unit.

Figure 7A:
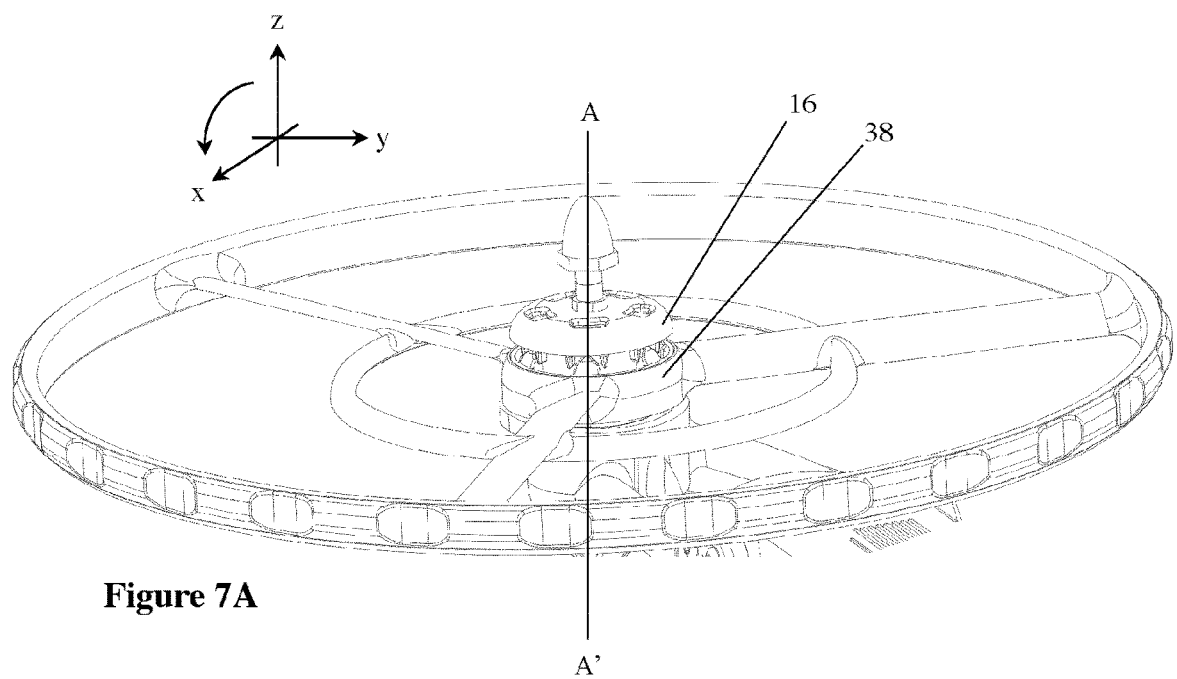
FIG. 7A is an isometric view of a propeller hub and wheel connection embodiment.

FIG. 7A is a tilted isometric view of a propeller hub 16 and wheel hub 38 connection embodiment. In this figure, the wheel serves as a water propeller. The wheel hub teeth on the wheel hub are being pushed into the cavities between the propeller hub teeth in the propeller hub, included in, or attached to the motor, while the support arm and attached propulsion unit is being rotated from a flight configuration with the motor unit axis being aligned, or approximately aligned with a vertical axis, to a land and/or water operation configuration, with water propellers and/or wheels being in a plane approximately vertical, or vertical, in this case for a small rotation angle from the flight configuration.

Figure 7B:
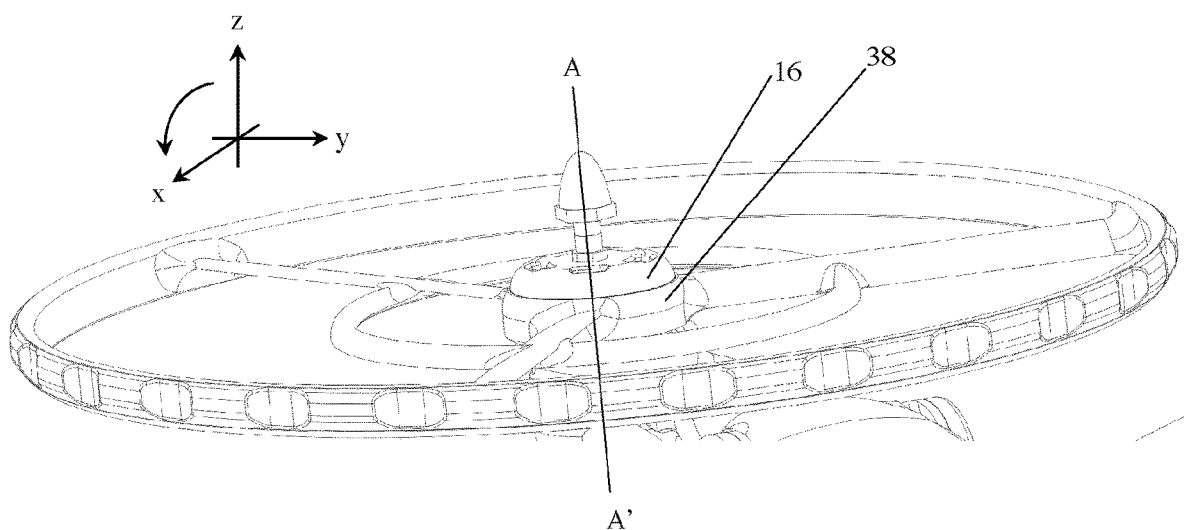
FIG. 7B is a tilted isometric view of a propeller hub connected wheel embodiment.

FIG. 7B is another tilted isometric view of a propeller hub connected to a wheel hub 38. This figure shows the teeth of the wheel/water propeller hub fully pushed into the cavities between the teeth in the propeller hub 16, included in, or attached to the motor, for a bigger rotation angle from the flight configuration, with respect to the previous figure. In this case the wheel and/or water propeller are connected to the motor, rotating with it.

Figure 8A:
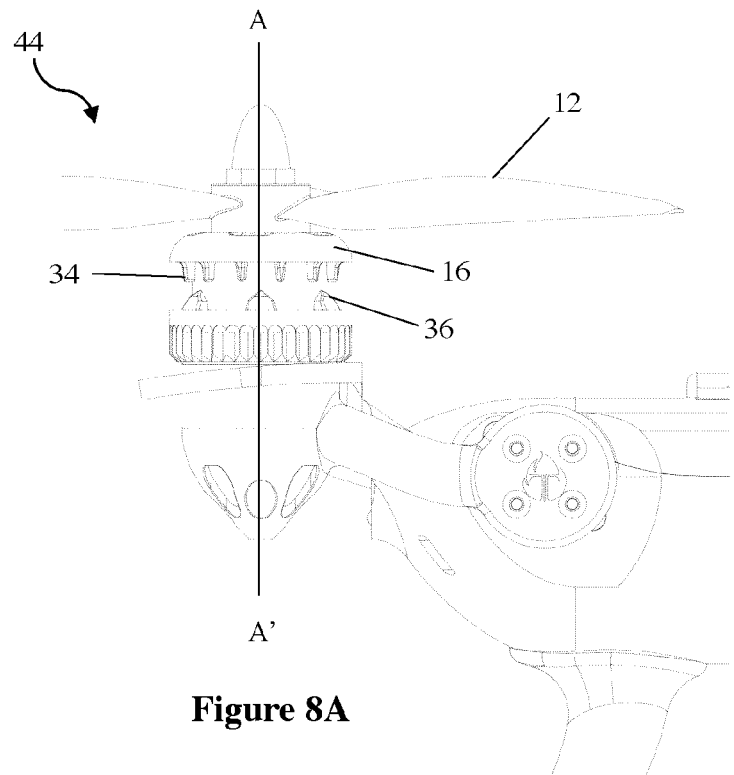
FIG. 8A is a side view of a disconnected propeller and wheel hub embodiment in a vertical propulsion axis position.

FIGS. 8A, 8B, 8C and 8D depict a possible embodiment, showing in more detail and close-up, the process presented in FIGS. 7A and 7B. In FIG. 8A, the propulsion unit 44 is shown in a flight configuration, with the propulsion axis A-A' of the propulsion motor being vertical, or approximately vertical. In this configuration, the wheel hub teeth 36 of the wheel or water propeller 12 are disengaged from the cavities between the propeller hub teeth 34 in the propeller hub 16. The propeller hub is engaged with the motor in the propulsion unit, included in, or attached to the motor, and therefore the wheel and/or water propeller are not connected to the motor and not moving with it.

Figure 8B:
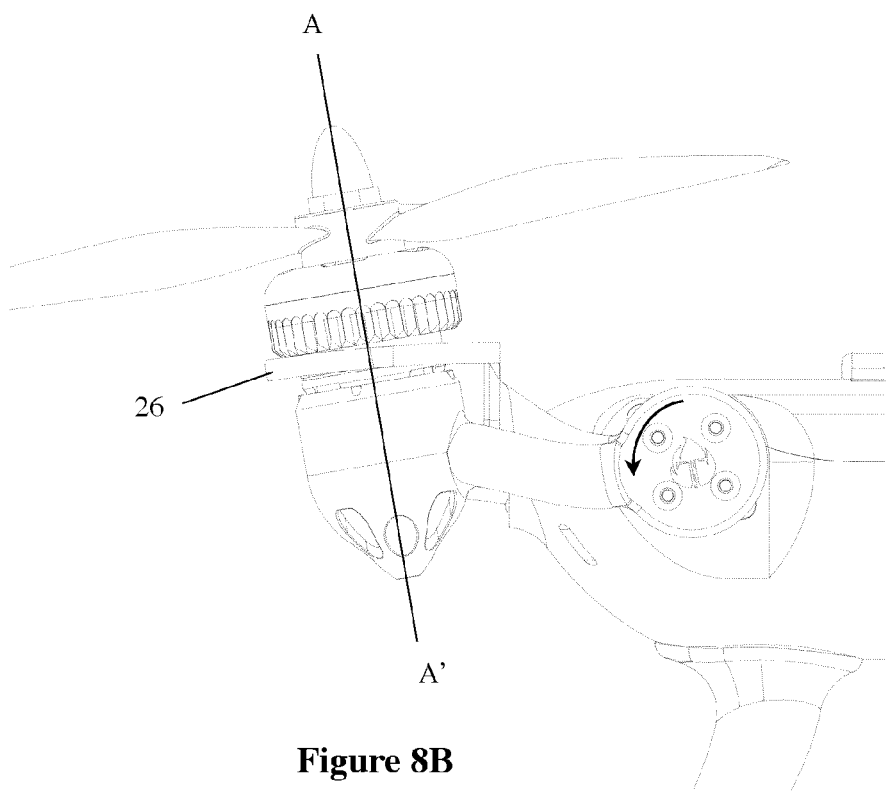
FIG. 8B is a side view of a connected propeller and wheel hub embodiment in transition between a vertical propulsion axis position to a horizontal propulsion axis position.
Figure 8C:
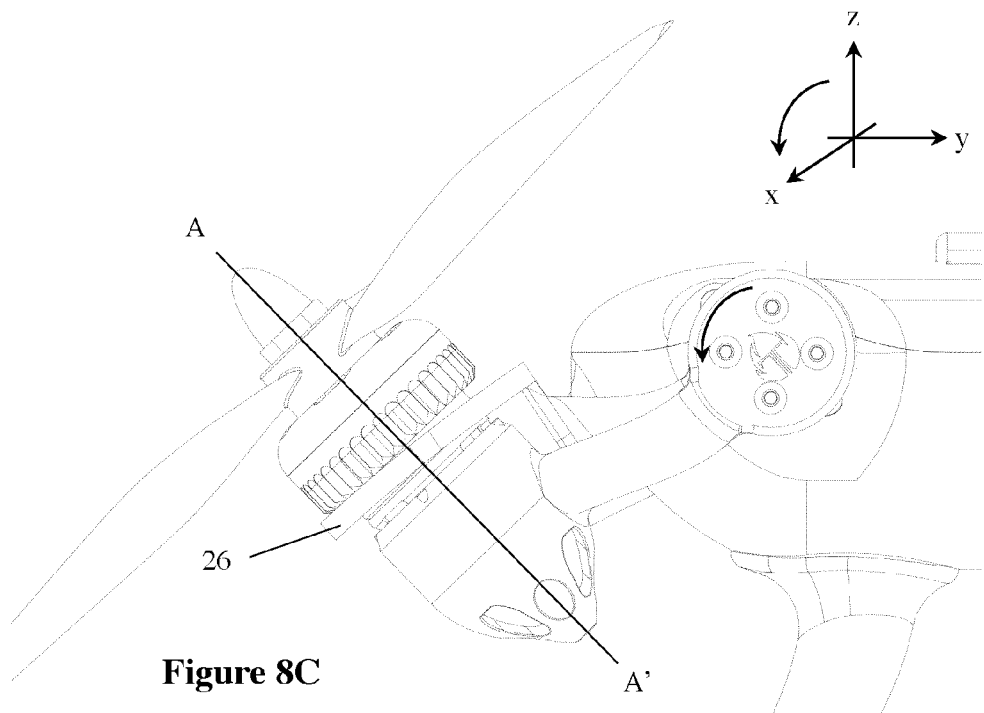
FIG. 8C is a side view of a connected propeller and wheel hub embodiment in transition between a vertical propulsion axis position to a horizontal propulsion axis position.
Figure 8D:
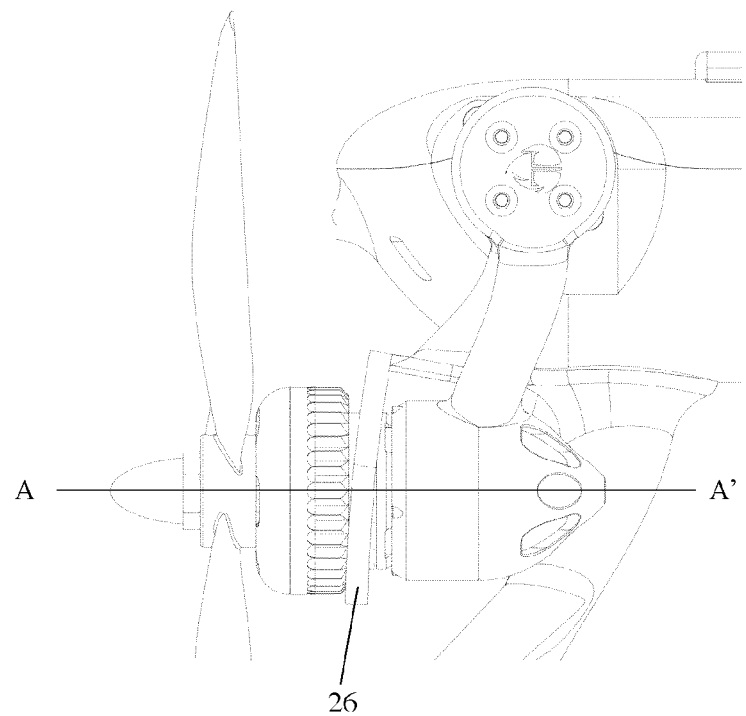
FIG. 8D is a side view of a connected propeller and wheel hub embodiment in a horizontal propulsion axis position.

In FIGS. 8B, 8C and 8D the pivoting rotation movement of the support arm and attached propulsion unit along the pivot axis (shown with a counter-clockwise arrow) is shown, with the teeth of the wheel/water propeller hub being pushed to the inside of the cavities in the propeller hub, included in, or attached to the motor. The wheel and/or water propeller are thereby connected to the motor and rotating with it. Connection of paddle 26 provides a guide for engagement of the teeth and pressure to encourage engagement of the propeller hub with the wheel hub. FIG. 8D shows the propulsion unit in a land operation configuration (and for some of such propulsion units in a water operation configuration), with the propulsion axis A-A' of the motor being horizontal, or approximately horizontal and the wheel and/or water propeller being in, or approximately in, a vertical position, ready to rotate for on land, or on, or underwater propulsion. The action of the paddle 26 is demonstrated.

Figure 9:
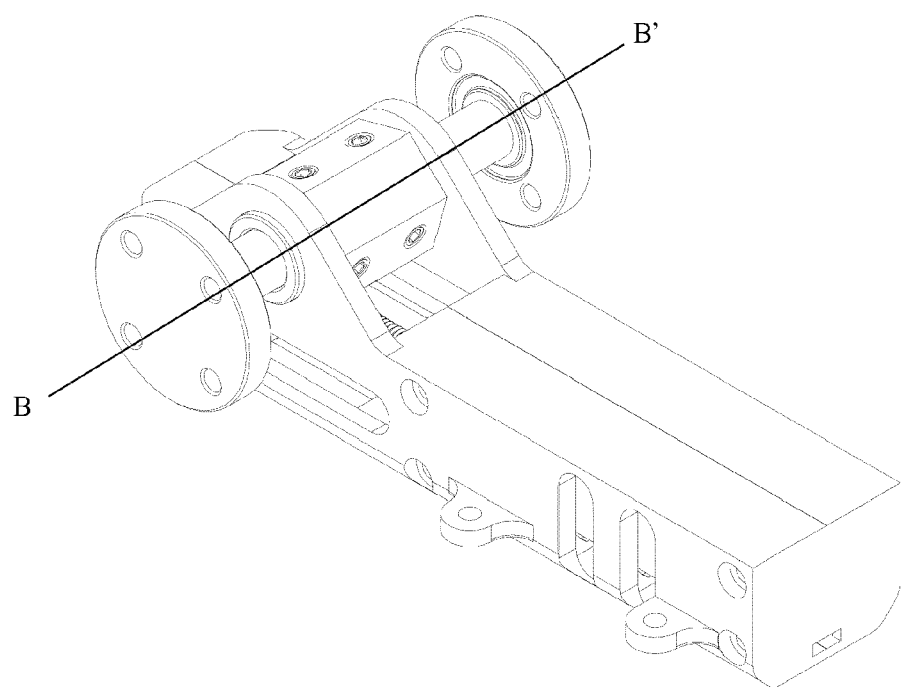
FIG. 9 is an isometric view of an embodiment of a pivot motor and pivot axis.

FIG. 9 is an isometric view of a pivot motor and pivot axle. The pivot motor controls the angle between the propeller axis and the vehicle body to position the propeller and wheel at the desired configuration for the vehicle mode. Servo motors, stepper motors, DC, or AC motors, in between others can be used, with their output axle directly connected to the pivot axle, or through a gearbox and/or other mechanical system. The mechanical system may include a worm, which in turn is engaged with a worm gear. In a possible configuration, the worm is aligned with the longitudinal direction of the pontoon containing it, while the worm gear is connected to the pivot axle, transverse to the worm and pontoon or support arm. In another embodiment, a lead screw mechanism may be used instead of a worm, or worm gear, or servo, or any other gear, or mechanical system. The use of worms, worm gears and/or lead screws may be advantageous, since these mechanical systems do not move when forces are applied to the worm gear, or a nut in the lead screw. This further enables energy conservation since the motor connected to the worm and/or lead screw does not need to be activated or powered always and therefore does not need to consume any energy to counteract any external force applied to the support arm to maintain the desired pivot angle of the propulsion unit. This is especially useful, for example, during an impact event of the propulsion unit with an outside object, during turbulence in flight or on or under water, or during wheel impacts while the vehicle is rotating on uneven and/or irregular ground. The pivot axle is then connected to a structure and/or to the propulsion unit to enable the pivoting rotation between the different vehicle operation modes. Further motors, or mechanical systems may be also applied, as well as commanding different rotation axis, to alter the applied force and therefore direction of applied and required propulsion forces, within one, all, or different modes (ex. also to provide for stabilization, path following, steering, etc.). These can be applied to one or more of the propulsion units.

Figure 10A:
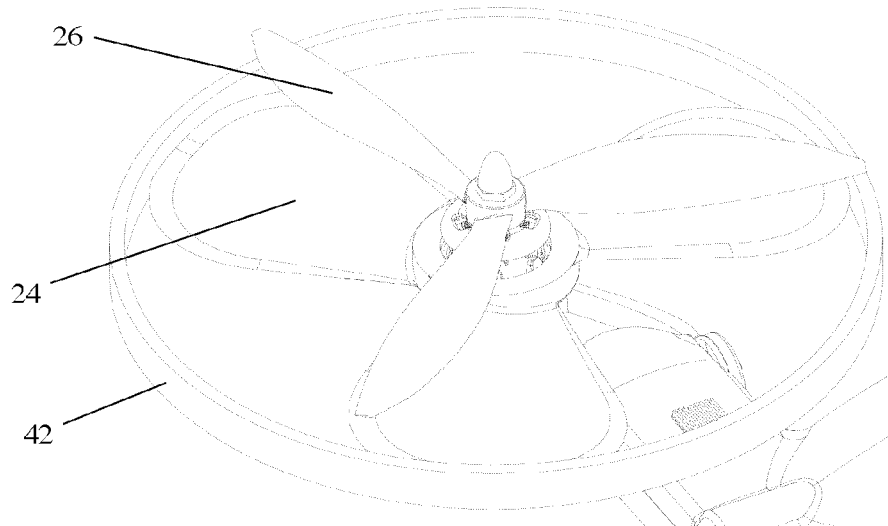
FIG. 10A is an isometric view of an embodiment of a wheel with airfoil wheel blades.
Figure 10B:
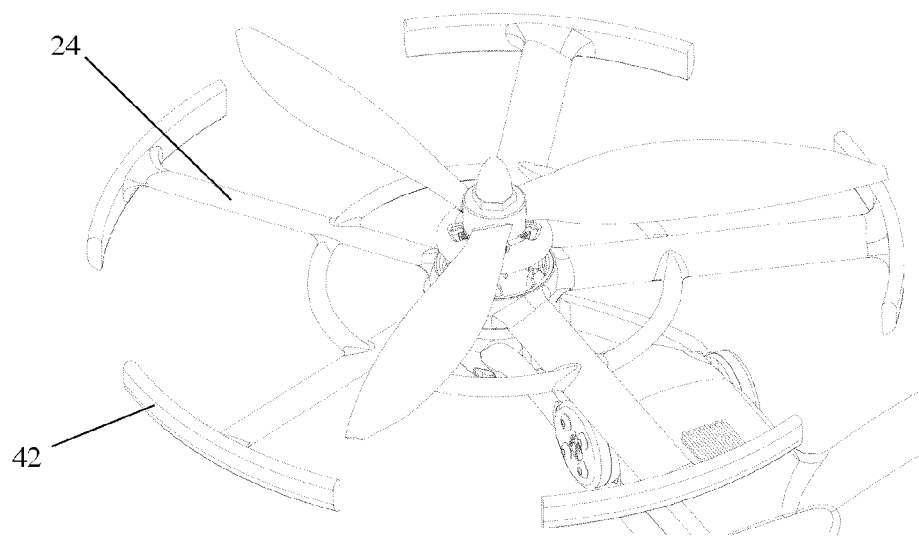
FIG. 10B is an isometric view of an embodiment of a wheel with a discontinuous outer rim and airfoil wheel blades.

FIGS. 10A and 10B illustrate two possible embodiments of a wheel/water propeller, with different number of wheel blades 24 or spokes having different shapes. The wheel blades can, for example, be airfoils that have different chords, tapper, angles, for example angles of incidence, attack, sweep, twist, and advance, and which can vary radially. FIG. 10A shows a continuous wheel track or continuous outer wheel rim 42 consisting of a full rim.

FIG. 10B shows a discontinuous or partially sectioned outer wheel rim. Each wheel may have a plurality of spokes, where the spokes for the wheels for propulsion on or in water are blades to provide efficient propulsion on and under water. In an embodiment, each wheel blade 24 can also be a complete aquatic propeller blade in which the outer rim 42 of the propeller blade is only composed of the blade tip. In this type of configuration a vehicle can be optimized for locomotion in air and water, such as may be used during ocean exploration. During propulsion in water, airfoil blades can be prone to cavitation due to pressure pockets which form around propulsion surfaces during rotation. When trying to use a propeller that is optimized purely for flight to generate thrust in water, beyond having an inefficient system, resulting cavitation may damage the blades of such a propeller designed for air operation. By having specifically designed blades for water propulsion, or optimized also for such, the air propeller blades can be spared some of the damage resulting from water propulsion.

Figure 11:
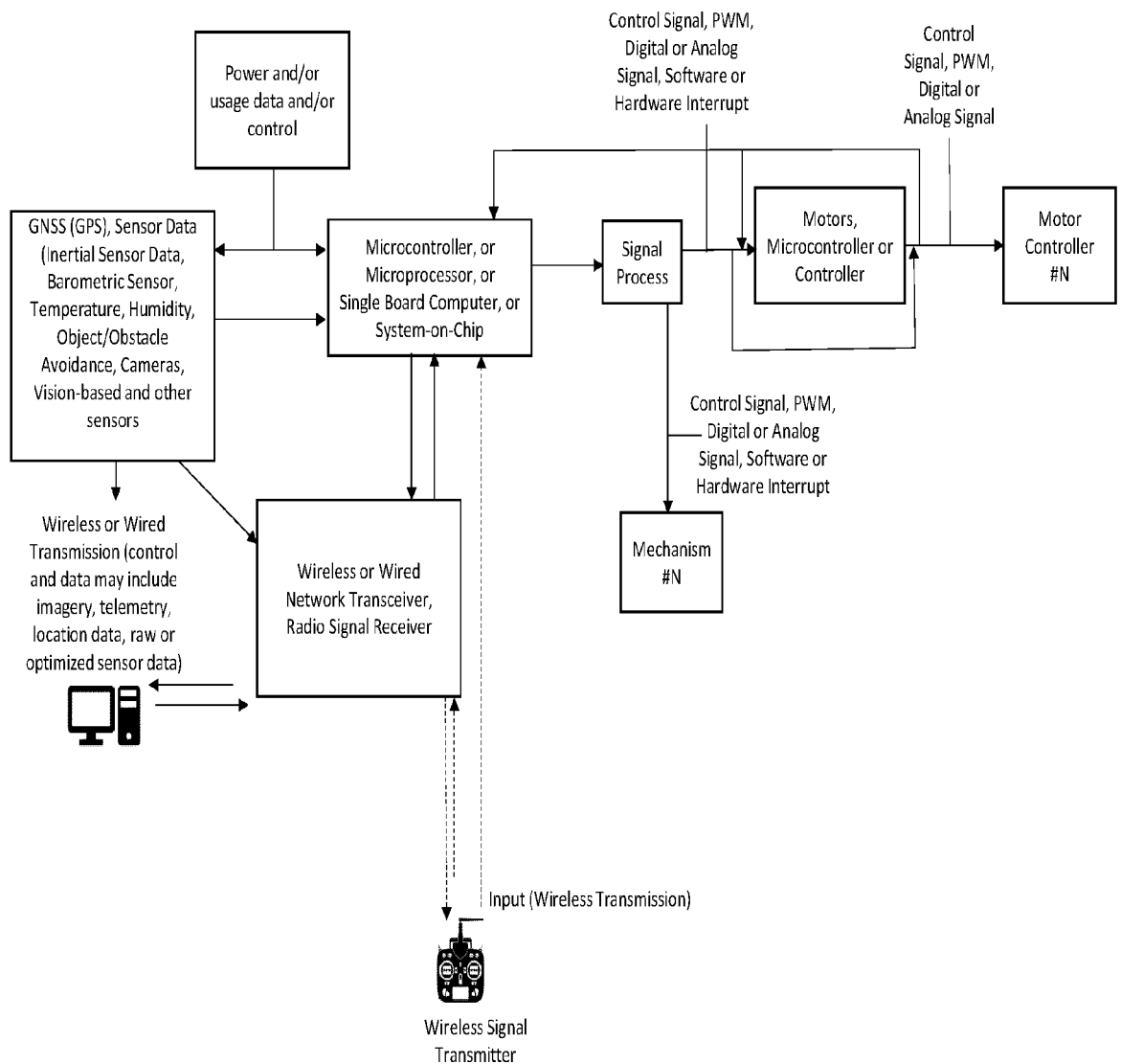
FIG. 11 is a flowchart of a control system for a multi-mode convertible vehicle in one embodiment.

FIG. 11 is a simplified flowchart of a possible control system for the present multi-mode convertible vehicle. The control system can be used to control the vehicle in all modes of operation. In an embodiment, the control system comprises one or more processor-sensor boards with one or more parallel or sequential processes running. A central hardware and/or software architecture may be implemented, as well as peripheral and/or decentralized hardware and/or software units. In one example, each decentralized unit may be dedicated to the operation and control of a specific mode, while the central hardware and/or software controls the overall operation, the peripheral units and performs other central functions. The control system may also have bi-directional motor controllers for controlling the speed of rotation of the propulsion motors as well as to change their direction of rotation, and torque to adjust between aerial, terrestrial, and aquatic modes of vehicle operation. It may also control mode change and the mechanisms and motor(s)/power unit(s) to achieve such changes. Available energy from available power sources, as well as power usage may be monitored and controlled by the control unit. The control system may also have one or more microprocessor chip (MPC), microcontroller unit (MCU), single board computer (SBC), and/or SoC (system on chip), an inertial measurement unit (IMU), and one or more sensors, for example a barometric pressure sensor, temperature sensor, humidity sensor, sound or noise sensor, light sensor, and vision or image based sensor. The control system may also have one or more communication elements such as a receiver, transmitter, or combination of receiver/transmitter to receive and/or transmit communications from, for example, a remote operator, central ground station, or remote wireless communications access point, such as 802.11 Wifi or other forms of radiofrequency or signal communication, which may include also satellite based. The control unit can also be configured to transfer commands to motors and other mechanical and electronic components based on externally received signals sent to communication elements connected to the control system. The control system can also provide actuator control inputs at high stabilization rates and can also control and operate other sensors and related systems included in the vehicle, which may include, for example, cameras, imaging, radar, distance and other types of sensors, and related systems, which may also include dedicated data communication systems.

In another embodiment the control system can be paired with the MPC, MCU, SBC and/or SoC, such that is able to operate without user control and switch between different modes using location and/or sensor data to determine current environment, and adapt the mode based on that (i.e. in flight, on land, on or under water, the mode would change automatically). This can also be achieved via software based on trained machine models that are able to work to determine a current configuration's landscape—this may be achieved through pre-programmed target parameters to be compared to and achieved, commands, controls and/or missions, and/or the use of artificial intelligence algorithms (which may include neural networks and/or genetic algorithms, in between others). These may be deterministic or stochastic. This may include control commands and data. Important steps/functions/operations may include:

SensorData—Analog, Digital—ex. GNSS/GPS, Location, Telemetry sensors that allow a given configuration to operate in an optimized manner (such as location based sensors (GNSS/GPS), Inertial Sensor Data, Barometric, Temperature, Object Detection/Obstacle Avoidance, imagery, radar)

ConfigurationOutput #N—has N fixed outputs depending on the number of configurations currently enabled in the embodiment.

ConfigurationInput—A hardware, software request, (e.g. interrupt, or state value that can be changed) which will change the configuration of the embodiment. If using a software interrupt, this can be triggered via machine models which are able to read sensor data and determine a current landscape and adjust the configuration of the embodiment, or determine a predetermined set of instructions that after a certain point in time, or location, to drive the mechanism motors.

CurrentConfiguration—The embodiment's current configuration, mapped to one of the available inputs that can be acquired from Configuration Toggle.

One possible execution could be, in a simplified manner, represented by:

```
(at all times)
LOOP:
  Read SensorData
  Calibrate Embodiment based on current position to ground, current
  relative and absolute (GNSS/GPS) location coordinates
  IF (ThrottleInput OR ThrottleInput OR RollInput OR PitchInput)
  Read Sensors
  Calibrate Embodiment based on current sensor data
  (Optional: Send logs, raw and calibrated sensor data, and
  transmission data to ground station or transmitter)
  Drive Motors (Propellers/Wheels)
  READ ConfigurationInput
  IF(ConfigurationInput IS NOT CurrentConfiguration)
    If (ConfigurationInput AND SystemStopped)
      Drive MechanismMotors
      Set ConfigurationOutput#N -- #N being a given
configuration
```

Figure 12:
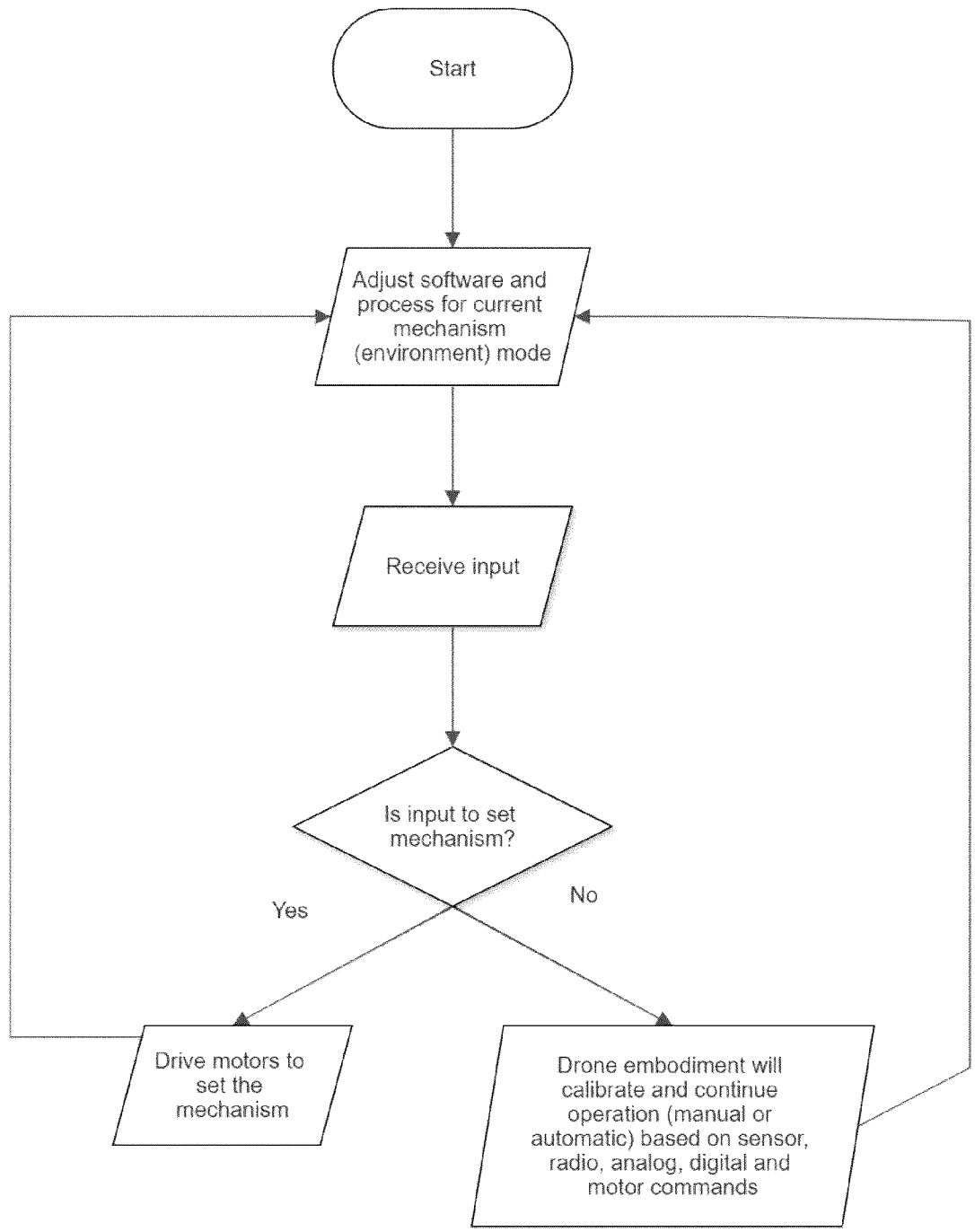
FIG. 12 is a flowchart of an example control method for a multi-mode convertible vehicle.

FIG. 12 is a flowchart of an example control method for a multi-mode convertible vehicle and shows one embodiment for the operation of the hardware and/or software architecture. A user can interface with the vehicle via, for example, a wireless transceiver or radio transmitter or through software commands either through a wireless or tethered through network. In the method, the software and process for the current locomotion mechanism, environment or mode is considered. An input is then received to the control system, either from a remote signal or internally from a vehicle component. If the received input is to set the locomotion mechanism or change the locomotion mode, then a signal is sent to the drive motors for the relevant propulsion units to change the propulsion unit configuration to the updated mechanism of locomotion. If the propulsion unit is already in its desired configuration, then the control system will continue operation and continue to monitor and calibrate the propulsion unit based on, for example, sensor, radio, analog, digital, and motor commands. Vehicle mode configuration can be updated according to this method throughout the operation of the vehicle.

Figure 13A:
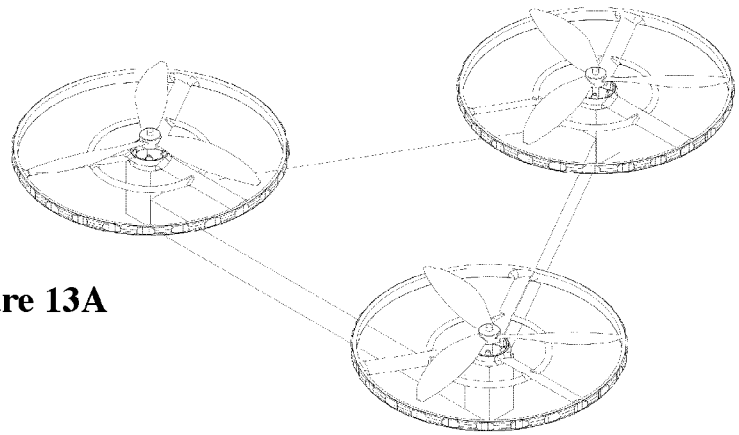
FIG. 13A is an alternative configuration of a multi-mode vehicle with propulsion units in aerial mode.
Figure 13B:
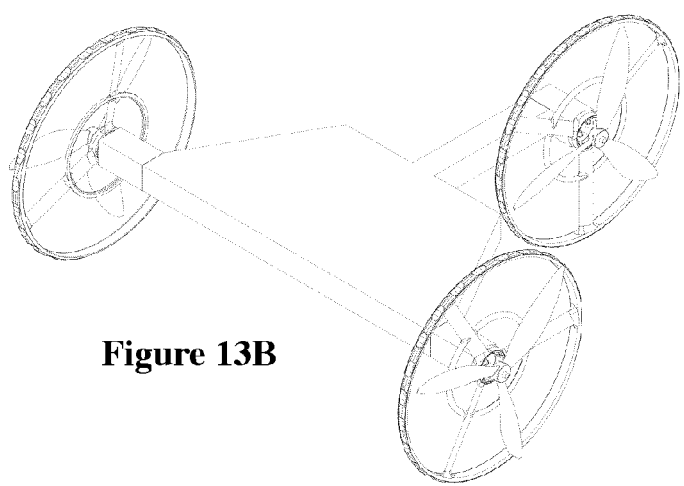
FIG. 13B is an alternative configuration of a multi-mode vehicle with propulsion units in terrestrial mode.
Figure 13C:
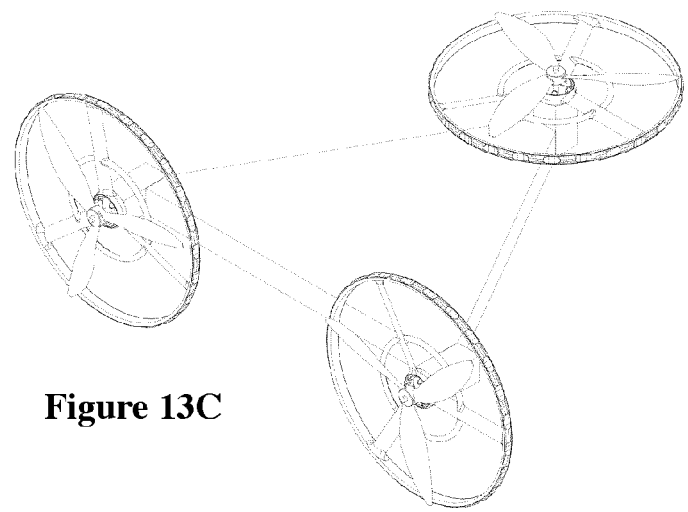
FIG. 13C is an alternative configuration of a multi-mode vehicle with propulsion units in aquatic mode.

FIGS. 13A, 13B and 13C show different embodiments for the vehicle propulsion units presented herein. FIG. 13A is a configuration of three propulsion units for operation in the air in an aerial mode in flight as a tricopter. FIG. 13B is a configuration of three propulsion units for operation on land in terrestrial mode as a tricycle. FIG. 13C is a configuration of three propulsion units in a water operation configuration in aquatic mode with two thrust propulsion units and one pitch/roll propulsion unit. In these embodiments three propulsion units, i.e. propeller/wheel sets are employed. Different embodiments of the invention can include a different number of propulsion units. A single pivot motor may also be used to actuate the change in position and direction of all propulsion units, or one pivot motor may be used to actuate one or more than one propulsion unit. This can be achieved through a mechanical system, which in one embodiment can be based in sets of geared mechanisms. For example, one pivot motor can be dedicated to two propulsion units and another pivot motor can be dedicated to another one or two propulsion units. In this way, it can become easier to set, for example, an aquatic configuration for the vehicle.

Figure 14A:
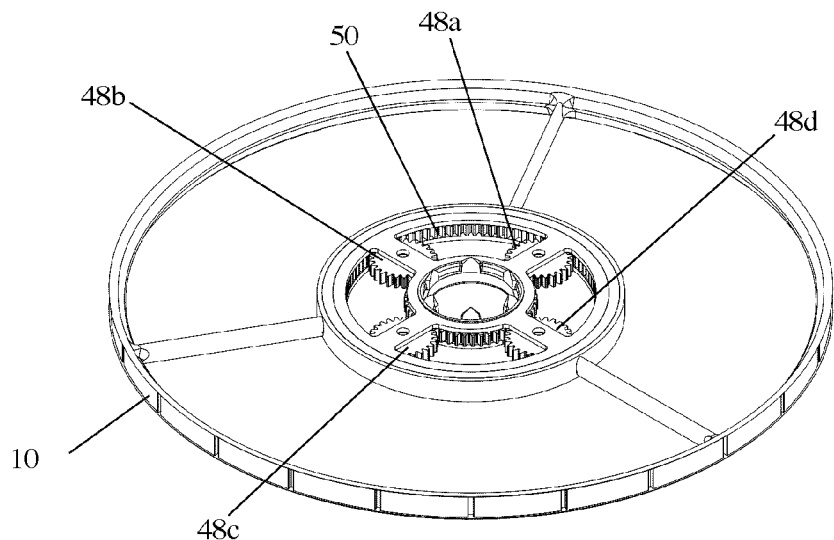
FIG. 14A is an isometric view of a wheel with a planetary gear configuration.

FIG. 14A is an isometric view of a wheel with a planetary gear configuration. A gear mechanical system can also be used to transmit power from the propulsion motors and/or propellers to the wheels. In the embodiment shown, a planetary gear system can be used. In one example planetary gear configuration, the planetary gear system can be incorporated into the wheel 10 with planet gears 48*a*, 48*b*, 48*c*, 48*d* engaged with outer ring gear 50. It is understood that the planetary gear system can comprise one or more planet gears, and preferably three or more planet gears.

Figure 14B:
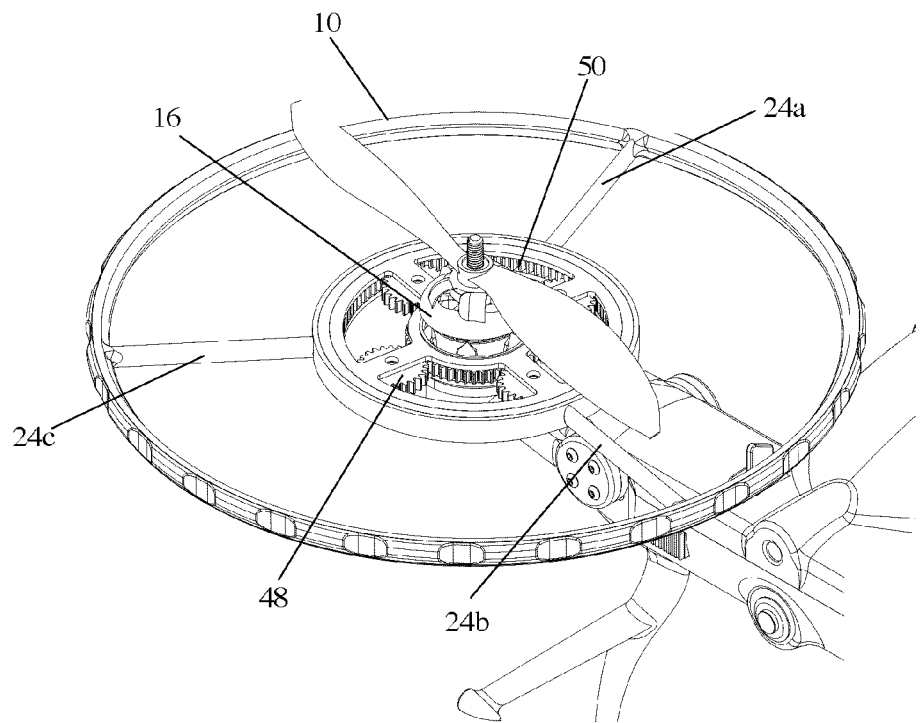
FIG. 14B is an isometric view of a wheel with a planetary gear configuration engaged with a propulsion unit.

FIG. 14B is an isometric view of a wheel with a planetary gear configuration with a propulsion unit. In this example the propulsion motor is surrounded by a wheel with a hub 16 with a geared element which can operate as a sun gear, which is mated with one or more planet gear 48 making a planet gear set, which in turn is mated to a ring gear 50 connected to the outside of the wheel 10. FIG. 14B shows an embodiment with the wheel hub disconnected from the propulsion unit (hub, and/or propeller hub), in an aerial (or partially aquatic) mode, with the propulsion unit axis pointing vertically or quasi-vertically, and the propeller and/or wheel in a horizontal, or quasi-horizontal plane. As explained previously, in such an embodiment, the wheel hub will be engaged with the propulsion unit (hub, and/or propeller hub) when pivoting, making the propulsion unit axis to point horizontally or quasi-horizontally, and the propeller and/or wheel in a vertical, or quasi-vertical plane, for a land locomotion configuration. An epicyclic gear train, also known as a planetary gearset, consists of two gears mounted so that the center of one gear revolves around the center of the other. A carrier connects the centers of the two gears and rotates the planet and sun gears mesh so that their pitch circles roll without slip. In this simplified case, rotation of the sun gear is controlled by the propulsion unit and propulsion unit motor and the planetary gear(s) roll around the sun gear. The example planetary gear train shown has the planet gears 48 rolling on the inside of the circle of an outer gear ring, or ring gear, sometimes called an annular gear, which sits as a ring inside wheel 10 and held in place by wheel blades 24a, 24b, 24c. Engagement and rotation of the sun gear with the planetary gears 48 causes rotation of ring gear 50 and wheel 10. In this embodiment the sun gear on wheel hub 16 can be reversibly disconnected, connected or loosely connected to the planetary gears 48 when in aerial mode such that rotation control of the wheel 10 can be optionally selected. The decision when to engage, disengage, or loosely engage the sun gear with the planetary gears will depend, in some embodiments, on the locomotion mode of the vehicle, the design of the propulsion unit, the design of the propulsion elements, and other aspects of the vehicle control system and design. A geared system enables to optimize rotation speeds of different elements, as well as optimize transmitted torque between different elements.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A multi-mode convertible vehicle comprising:
a vehicle body;
a plurality of propulsion units, each propulsion unit having a propulsion axis and pivotally connected to the vehicle body by a support arm, each of the plurality of propulsion units comprising:
a propeller comprising a propeller hub;
a propulsion motor connected to the propellor hub for rotating the propeller hub on the propulsion axis; and
a wheel comprising a wheel hub, at least one wheel blade, and an outer wheel rim, the wheel hub reversibly mechanically engageable with the propeller hub and rotatable on the propulsion axis, the wheel hub and propeller hub comprising engagement features to functionally connect the propeller hub and the wheel hub when the propulsion axis is pivoted in a horizontal position; and
a pivot motor connected to at least one propulsion unit to adjust a pivot position of the propulsion axis to a horizontal position or a vertical position relative to the vehicle body,
wherein when the propulsion axis is in a vertical position the propeller hub is disengaged from the wheel hub and when the propulsion axis is in a horizontal position the propeller hub is engaged with the wheel hub such that power supplied to the propeller hub from the propulsion motor is transferred to the wheel hub.

2. The vehicle of claim 1, wherein when the propulsion axis is in a vertical or approximately vertical position relative to the vehicle body the propellor hub is rotated by the propeller motor independent of the wheel, and when the propulsion axis is pivoted in a horizontal or approximately horizontal position relative to the vehicle body the propeller hub and wheel are engaged and the propeller motor turns the wheel and propeller.

3. The vehicle of claim 1, wherein each propeller hub is connectable to a corresponding wheel in the propulsion unit through at least one gear.

4. The vehicle of claim 1, wherein the vehicle comprises three or four, or more propulsion units.

5. The vehicle of claim 1, wherein the wheel hub is engageable with the propeller hub using one or more of a magnet, spring, fork, paddle, and clutching element.

6. The vehicle of claim 1, wherein the vehicle body is articulated.

7. The vehicle of claim 1, wherein each of the plurality of propulsion units has its own pivot motor.

8. The vehicle of claim 1, wherein the wheel comprises a planetary gear and the wheel hub serves as a sun gear in the planetary gear.

9. The vehicle of claim 1, wherein the propeller hub and wheel hub have engageable teeth.

10. The vehicle of claim 1, wherein the propulsion unit further comprises a propulsion clutch configured to apply pressure to the wheel to connect the propeller and the wheel when the propulsion axis is pivoted in a horizontal position.

11. The vehicle of claim 1, further comprising a retaining element to retain the wheel in a disconnected position from the propeller when the propulsion axis is pivoted in a vertical or approximately vertical position.

12. The vehicle of claim 1, further comprising a landing gear.

13. The vehicle of claim 12, wherein the landing gear further comprises a positioning arm which aligns with the wheel and supports wheel rotation when the propulsion axis is pivoted in a horizontal or approximately horizontal position.

14. The vehicle of claim 1, wherein the vehicle body has neutral buoyancy in water.

15. The vehicle of claim 1, wherein each wheel comprises a plurality of wheel blades.

16. The vehicle of claim 15, wherein each of the plurality of wheel blades is an airfoil configured for aquatic propulsion.

17. The vehicle of claim 1, further comprising one or more sensor, antenna, receiver, transmitter, communications system, camera, GNSS system, GPS system, barometer, Inertial Measurement Unit (IMU), gyroscope, accelerometer, magnetometer, data transmission system, imagery transmission, cargo container, or payload container.

18. The vehicle of claim 1, wherein the pivot motor comprises one or more worm and worm gear or lead screw mechanism.

19. The vehicle of claim 1, further comprising a front pontoon attached to one or more front propulsion units and a rear pontoon attached to one or more rear propulsion units.

20. The vehicle of claim 19, further comprising one or more body articulation pivot between the front pontoon and the rear pontoon.

21. The vehicle of claim 19, wherein each of the front pontoon and rear pontoon is attached to two propulsion units.

\* \* \* \* \*